US012140316B2

(12) United States Patent
Park et al.

(10) Patent No.: US 12,140,316 B2
(45) Date of Patent: Nov. 12, 2024

(54) HOME APPLIANCE

(71) Applicant: Samsung Electronics Co., Ltd., Suwon-si (KR)

(72) Inventors: Wan Gi Park, Suwon-si (KR); Byoung Hak Kim, Gunpo-si (KR); Yong Bin Lim, Suwon-si (KR); Jeong Hoon Kang, Seoul (KR); Dong Hyun Sohn, Hwaseong-si (KR); Ga Young Jo, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1012 days.

(21) Appl. No.: 16/992,364

(22) Filed: Aug. 13, 2020

(65) Prior Publication Data

US 2020/0370756 A1 Nov. 26, 2020

Related U.S. Application Data

(62) Division of application No. 16/127,805, filed on Sep. 11, 2018, now Pat. No. 10,782,029.

(30) Foreign Application Priority Data

Sep. 29, 2017 (KR) ........................ 10-2017-0128332

(51) Int. Cl.
*F24C 15/00* (2006.01)
*E05F 1/12* (2006.01)
(Continued)

(52) U.S. Cl.
CPC .......... *F24C 15/023* (2013.01); *E05F 1/1261* (2013.01); *E05F 5/02* (2013.01);
(Continued)

(58) Field of Classification Search
CPC ...... F24C 15/023; F24C 15/02; E05F 1/1261; E05F 5/02; E05F 5/10; E05F 1/1246;
(Continued)

(56) References Cited

U.S. PATENT DOCUMENTS 8,533,914 B2 9/2013 Vanini
8,959,709 B2 2/2015 Hasegawa et al.
(Continued)

FOREIGN PATENT DOCUMENTS

AU 2007-291476 A2 5/2009
CN 101512088 A 8/2009
(Continued)

OTHER PUBLICATIONS

International Search Report dated Jan. 17, 2019, issued in International Patent Application No. PCT/KR2018/010793.
(Continued)

*Primary Examiner* — Janet M Wilkens
(74) *Attorney, Agent, or Firm* — Jefferson IP Law, LLP

(57) ABSTRACT

A home appliance is provided. The home appliance includes a main body having an opening, a door disposed on one side of the main body, the door being configured to open or close the opening, and a damping assembly configured to be operated by the door. The damping assembly includes a first lever installed in the main body, the first lever being configured to be movable when the door is pressed, a second lever connected to the first lever, and a cylinder connected to the second lever, the cylinder being configured to be movable in a direction that is parallel to a movement path of the first lever.

7 Claims, 27 Drawing Sheets

(51) Int. Cl.
*E05F 5/02* (2006.01)
*E05F 5/10* (2006.01)
*F24C 15/02* (2006.01)

(52) U.S. Cl.
CPC ........... *E05F 5/10* (2013.01); *E05Y 2201/256* (2013.01); *E05Y 2201/264* (2013.01); *E05Y 2201/474* (2013.01); *E05Y 2900/308* (2013.01)

(58) Field of Classification Search
CPC ..... E05F 1/1253; E05F 1/1269; E05F 1/1276; E05F 1/1292; E05F 3/02; E05Y 2201/256; E05Y 2201/264; E05Y 2201/474; E05Y 2201/488; E05Y 2900/308; E05Y 2201/41; E05Y 2201/412; E05Y 2201/414; E05Y 2201/416; E05Y 2201/40; E05Y 2201/46; E05D 11/1064; A47L 15/4261; F25D 2323/024; D06F 39/14; F16F 15/03; F16F 6/00; F16F 6/005
USPC ..... 312/319.2, 319.1, 325, 327, 328; 16/286
See application file for complete search history.

(56) References Cited

U.S. PATENT DOCUMENTS

| | | | | |
|---|---|---|---|---|
| 10,352,081 | B2 | 7/2019 | Hirtsiefer et al. | |
| 10,641,027 | B2 * | 5/2020 | Lee | E05D 11/00 |
| 11,162,288 | B2 * | 11/2021 | Lee | E05D 11/1064 |
| 2008/0289144 | A1 | 11/2008 | Vanini | |
| 2011/0017191 | A1 | 1/2011 | White et al. | |
| 2013/0307392 | A1 | 11/2013 | Elkasevic et al. | |
| 2014/0130302 | A1 * | 5/2014 | Bettinzoli | E05D 11/00 16/304 |
| 2015/0152675 | A1 | 6/2015 | Vanini | |
| 2019/0353353 | A1 * | 11/2019 | White | F24C 15/023 |

FOREIGN PATENT DOCUMENTS

| | | | |
|---|---|---|---|
| CN | 104846585 | A | 8/2015 |
| CN | 106103875 | A | 11/2016 |
| CN | 108644830 | * | 10/2018 |
| DE | 20306043 | * | 9/2004 |
| DE | 102008018867 | * | 10/2009 |
| EP | 1 995 524 | A2 | 11/2008 |
| EP | 2 284 344 | A2 | 2/2011 |
| EP | 2 562 341 | A2 | 2/2013 |
| EP | 2 562 341 | B1 | 10/2015 |
| EP | 2977537 | * | 1/2016 |
| EP | 3073038 | * | 9/2016 |
| FR | 2 869 343 | A1 | 10/2005 |
| JP | 2009139020 | * | 6/2009 |
| JP | 2011-075125 | A | 4/2011 |
| JP | 2016-223661 | A | 12/2016 |
| KR | 20-0410197 | Y1 | 3/2006 |
| KR | 10-2009-0031116 | A | 3/2009 |
| KR | 10-2010-0055110 | A | 5/2010 |
| KR | 10-1729058 | B1 | 4/2017 |
| KR | 10-2017-0108482 | A | 9/2017 |
| WO | 2018147321 | * | 8/2018 |

OTHER PUBLICATIONS

Extended European Search Report dated Oct. 2, 2020, issued in European Patent Application No. 18862841.6.

Korean Office Action dated Sep. 20, 2022, issued in Korean Patent Application No. 10-2017-0128332.

European Office Action dated Jul. 4, 2022, issued in European Patent Application No. 18 862 841 .6.

Chinese Office Action dated May 18, 2021, issued in Chinese Patent Application No. 201880076411.5.

Hearing Notice—Indian Office Action dated Sep. 22, 2023, issued in Indian Application No. 202017017326.

European Search Report dated Feb. 19, 2024, issued in European Application No. 18 862 841.6.

* cited by examiner

HOME APPLIANCE

CROSS-REFERENCE TO RELATED APPLICATION(S)

This application is a divisional application of prior application Ser. No. 16/127,805, filed on Sep. 11, 2018, which application is based on and claims priority under 35 U.S.C. § 119(a) of a Korean patent application number 10-2017-0128332, filed on Sep. 29, 2017, in the Korean Intellectual Property Office, the disclosure of which is incorporated by reference herein in its entirety.

BACKGROUND

1. Field

The disclosure relates to a home appliance. More particularly, the disclosure relates to a home appliance including a damping assembly with an improved structure for reducing abrasion, impacts, and noise that are caused by repetitive use of a door.

2. Description of the Related Art

In general, a damping assembly is applied to all kinds of home appliances having a door for opening and closing operations.

There are a left/right hinged door that is opened and closed in a left or right direction with respect to the left or right side of the door, and an up/down hinged door that is opened and closed in an up or down direction with respect to the upper side of the door.

Since the up/down hinged door wears down, receives impacts, or generates noise when it is repetitively closed, the up/down hinged door generally includes a damper for causing the door to be slowly closed from at a predetermined angle.

However, the damper is configured to perform a rotatory motion or a horizontal or vertical translation motion, and accordingly the damper has difficulties in operation conversion and also has a complicated configuration.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a home appliance including a damping assembly with an improved structure for reducing abrasion, impacts, and noise that are caused by repetitive use of a door.

Another aspect of the disclosure to provide a home appliance including a damping assembly capable of reducing manufacturing cost with a small number of parts.

Another aspect of the disclosure to provide a home appliance including a door apparatus capable of reducing impacts and noise by buffering a door when the door is closed.

Additional aspects will be set forth in part in the description which follows and, in part, will be apparent from the description, or may be learned by practice of the presented disclosure.

In accordance with an aspect of the disclosure, a home appliance is provided. The home appliance includes a main body having an opening, a door disposed on one side of the main body, the door being configured to open or close the opening, and a damping assembly configured to be operated by the door. The damping assembly comprises a first lever installed in the main body, the first lever being configured to be movable when the door is pressed, a second lever connected to the first lever, and a cylinder connected to the second lever, the cylinder being configured to be movable in a direction that is linear to a movement path of the first lever.

Also, the damping assembly may include an elastic member configured to elastically support the first lever and the cylinder.

Also, the damping assembly may include a damping bracket which is installed in the main body and in which the first lever, the second lever, and the cylinder are installed.

Also, the damping bracket may include an accommodating space in which the first lever, the second lever, and the cylinder are accommodated, and a first lever installing space formed by opening at least a part of the accommodating space.

Also, the damping bracket may include at least one guide protrusion, and the first lever may include at least one guide slit corresponding to the at least one guide protrusion, and configured to move the first lever.

Also, the first lever may include a contact portion formed at a front end of the first lever and configured to be pressed by the door, and a second lever connecting portion having at least a portion protruding upward to be connected to the second lever.

Also, the second lever may include a first lever connecting portion connected to the second lever connecting portion.

Also, the first lever may further include an elastic member connecting portion connected to the elastic member.

Also, the damping assembly may include a cylinder housing installed in the damping assembly and accommodating the cylinder, wherein at least one end of the elastic member may be connected to the cylinder housing.

Also, the cylinder may be disposed to be parallel to or vertical to a movement path of the first lever.

Also, a movement direction of the first lever may be inclined with respect to a bottom of the main body.

In accordance with another aspect of the disclosure, a home appliance is provided. The home appliance includes a main body having an opening, a door configured to open or close the opening, a lever installed in the main body, the lever being configured to be movable between a first position and a second position, a damper installed in the main body, the damper being configured to, when the lever is pressed by the door to move from the first position to the second position, generate a resistance in a direction that is opposite to a movement direction of the lever, and at least one elastic member configured to, when pressure applied on the lever is removed, elastically bias the lever such that the lever moves from the second position to the first position.

Also, the damper may generate the resistance in a direction that is parallel to or vertical to a movement path of the lever.

Also, the home appliance may further include a guide portion configured to move the lever with respect to the main body, wherein the guide portion may include at least one guide protrusion formed in the main body, and at least one slit formed in the lever to correspond to the at least one guide protrusion.

Also, the damper may include a piston rod connected to the lever, a cylinder connected to the piston rod, and a cylinder housing accommodating the cylinder and installed in the main body.

Also, one end of the elastic member may be connected to the cylinder housing, and the other end of the elastic member may be connected to the lever.

Also, the movement direction of the lever may be inclined with respect to a bottom of the main body.

Also, a movement direction of the piston rod may be parallel to or vertical to the movement direction of the lever.

In accordance with another aspect of the disclosure, a home appliance is provided. The home appliance includes a main body having an opening, a door connected to the main body, the door being configured to open or close the opening, a lever installed in the main body, the lever being configured to be movable by the door when the door is closed, and a damper installed in the main body and being connected to the lever, the damper being configured to generate a resistance in a direction that is parallel to or vertical to a movement direction of the lever. The movement direction of the lever is inclined with respect to a bottom of the main body.

Also, the home appliance may further include an elastic member connecting the lever to the damper and configured to elastically support the lever and the damper.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The terms "front end," "rear end," "upper portion," "lower portion," "upper end," and "lower end" are defined based on the drawings, and the shapes and positions of the corresponding components are not limited by the terms. The disclosure may be applied to all kinds of home appliances having a door for performing opening and closing operations.

There are a left/right hinged door that is opened and closed in a left or right direction with respect to the left or right side of the door, and an up/down hinged door that is opened or closed in an up or down direction with respect to the upper side of the door.

The up/down hinged door that is opened and closed in the up or down direction with respect to the upper side of the door may be applied to various kinds of home appliances, such as an oven, a microwave, and a dish washer. For example, the up/down hinged door may be applied to a heating cooker including a main body in which a cooking room is formed and a door coupled with the main body to open or close the cooking room. Hereinafter, the heating cooker will be described as an example. Meanwhile, in the embodiments of the disclosure, an up/down hinged door that is opened and closed in the up or down direction will be described as an example. However, the technical concept of the disclosure is not limited to the up/down hinged door, and the door may be a type that moves in a front-back direction with respect to the main body.

Figure 1:
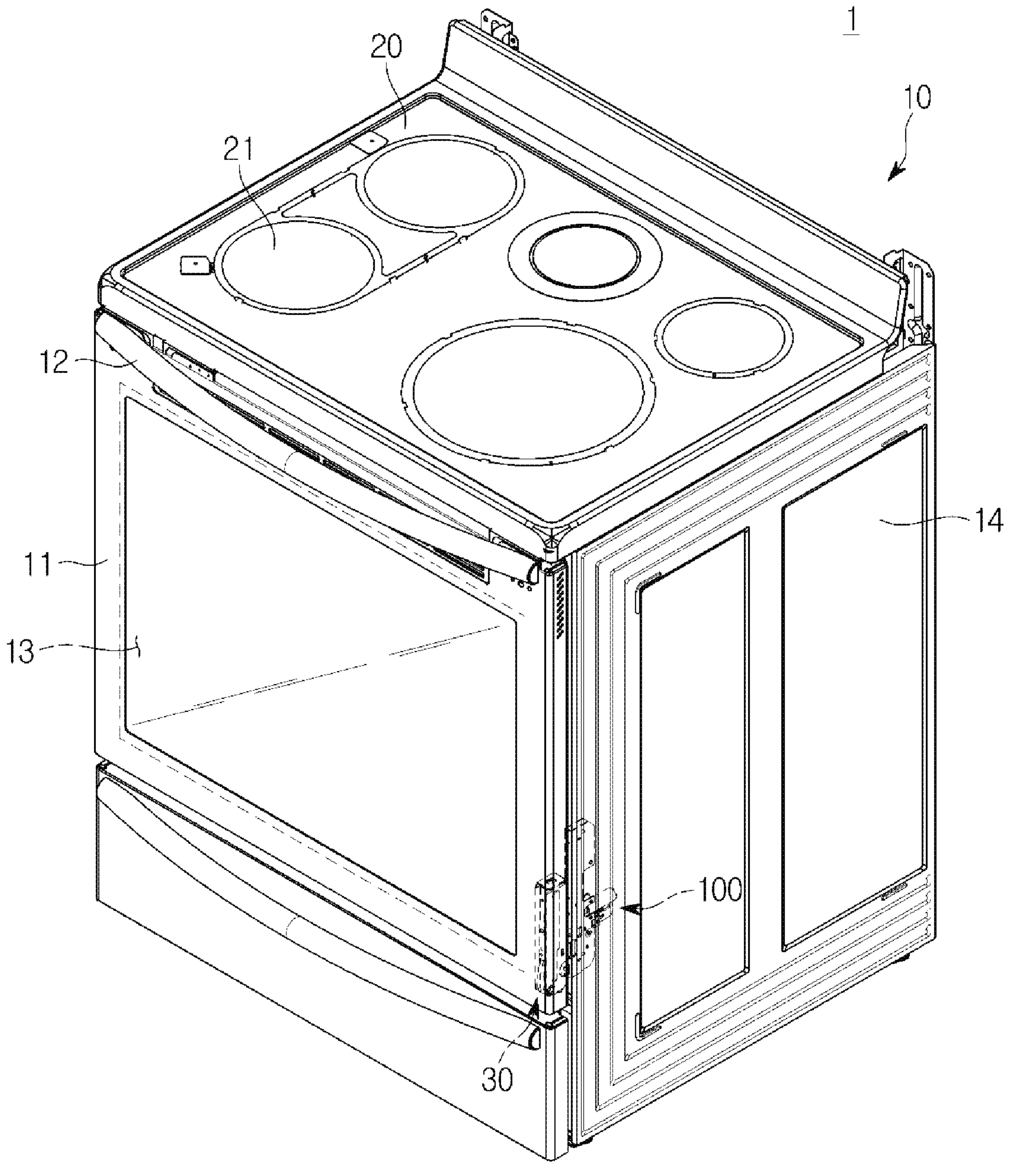
FIG. 1 is a perspective view of a heating cooker with a damping assembly according to a first embodiment of the disclosure.

FIG. 1 shows a heating cooker according to a first embodiment of the disclosure.

Referring to FIG. 1, a heating cooker 1 may include a main body 10, and a cavity (not shown) formed in the inside of the main body 10 and used as a cooking space where food is cooked. On the outer surface of the main body 10, a cover 14 may be provided to cover the main body 10.

On the upper portion of the main body 10, a cooktop 20 including at least one heater 21 may be disposed. The heating cooker 1 may use electricity or gas as an energy source for heating cooking materials.

In the front portion of the main body 10, an opening 13 may be formed to put food into the cavity or to take food out of the cavity.

Also, a door 11 may be disposed to selectively open or close the opening 13 of the main body 10. On the front upper portion of the door 11, a handle 12 may be disposed to enable a user to easily open or close the door 11.

The door 11 may be rotatably hinge-coupled to the lower end of the main body 10. The door 11 may be hinge-coupled to the main body 10 by a hinge apparatus 30. The door 11 may include a damping assembly 100 disposed between the door 11 and the main body 10 and operating by the door 11.

Figure 2:
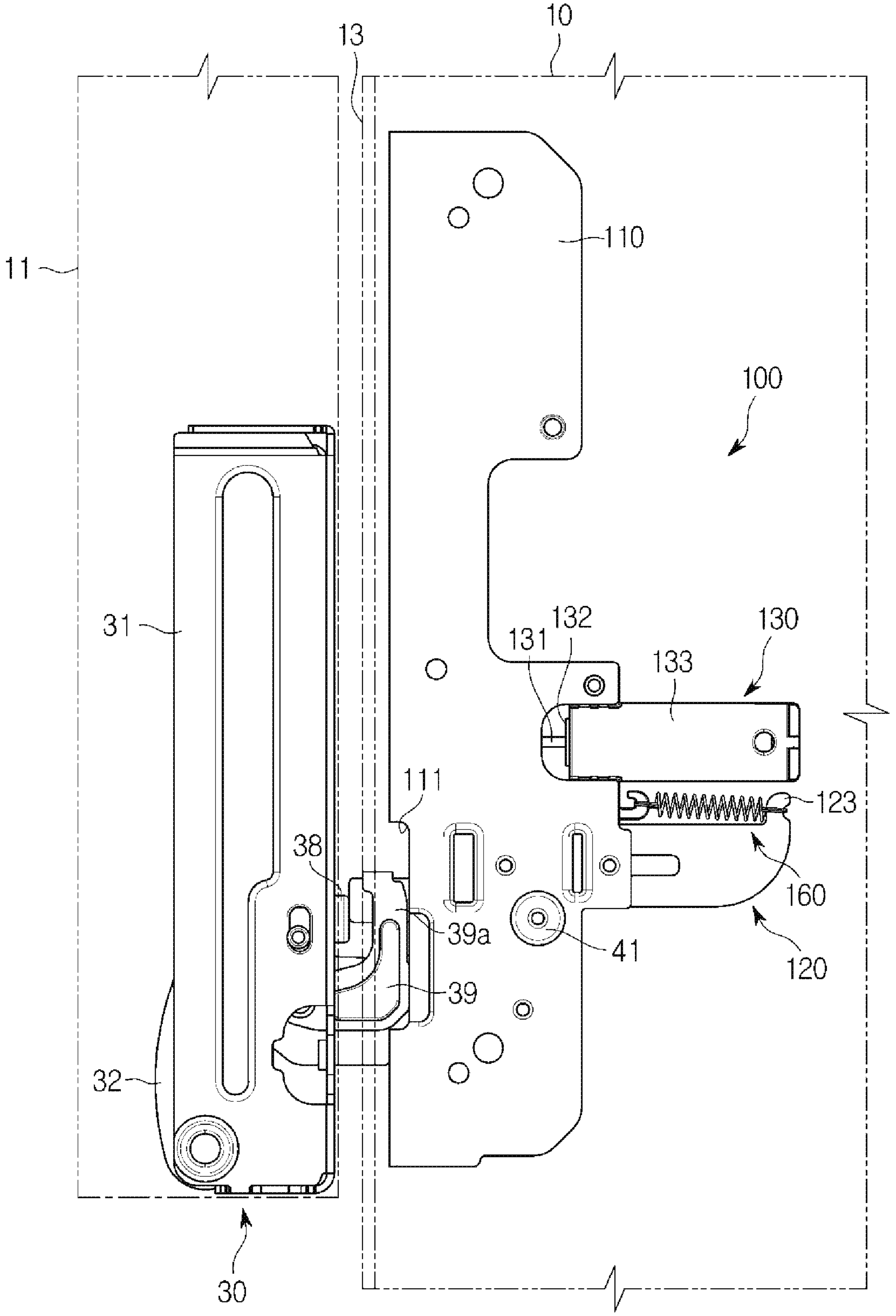
FIG. 2 shows a hinge apparatus installed between a main body and a door, and the damping assembly, according to the first embodiment of the disclosure.
Figure 3:
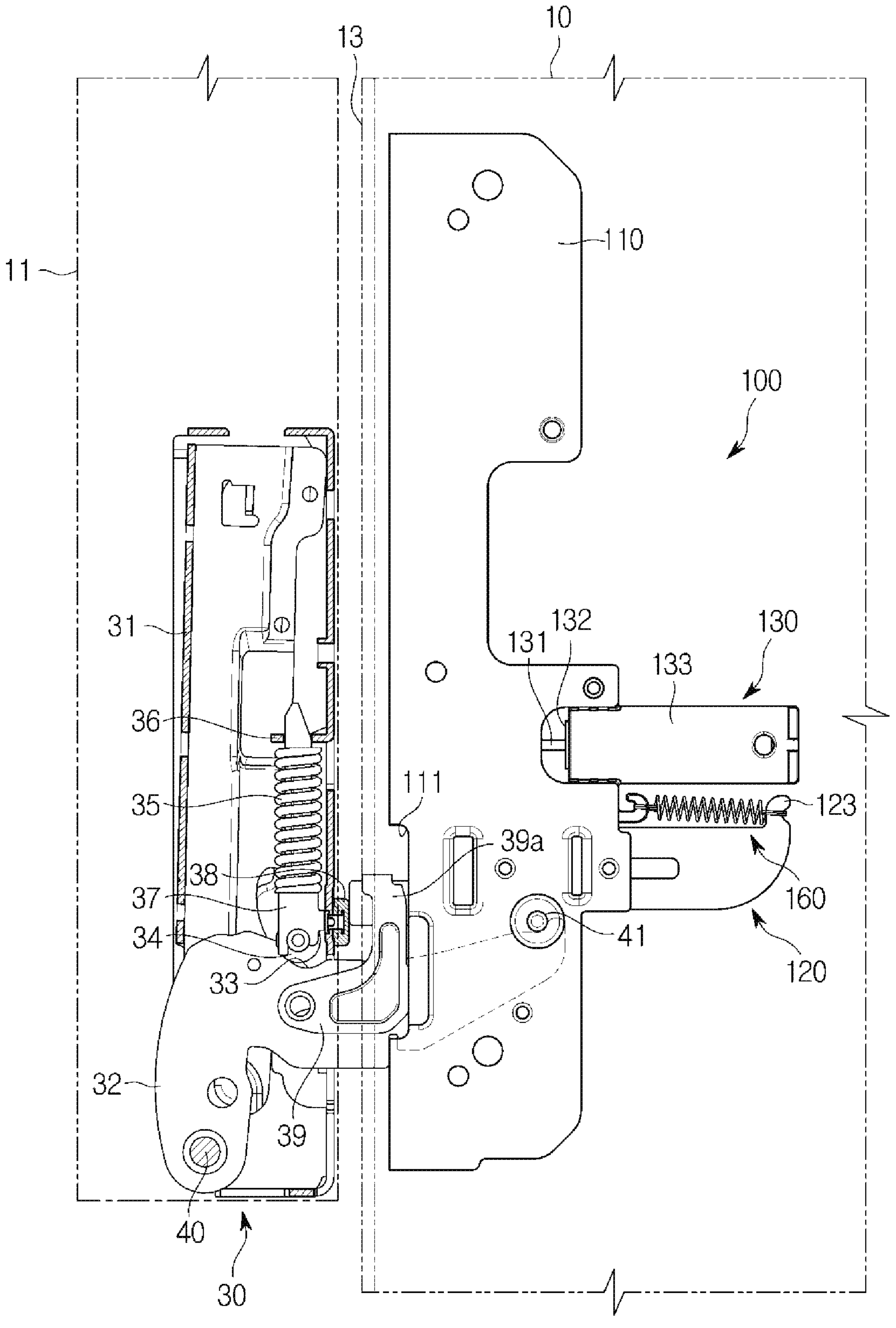
FIG. 3 is a partially exploded view of the hinge apparatus of the door, according to the first embodiment of the disclosure.

FIG. 2 shows the hinge apparatus installed between the main body and the door, and the damping assembly, according to the first embodiment of the disclosure, and FIG. 3 is a partially exploded view of the hinge apparatus of the door, according to the first embodiment of the disclosure.

Referring FIGS. 2 and 3, the hinge apparatus 30 may be disposed between the door 11 and the main body 10. Also, the damping assembly 100 may be disposed between the door 11 and the main body 10. The hinge apparatus 30 and the damping assembly 100 may be disposed at both sides of the door 11.

The hinge apparatus 30 may be disposed at the lower end of the door 11. The hinge apparatus 30 may include a hinge bracket 31, and a door hinge 32 installed in the hinge bracket 31 and being the center of rotation of the door 11.

At least a portion of the hinge bracket 31 may open to enable the door hinge 32 to connect to the main body 10.

One end of the door hinge 32 may be installed on the hinge bracket 31 of the door 11, and the other end of the door hinge 32 may be installed on the main body 10. The upper portion of the door hinge 32 may be partially recessed to form a guide surface 33 that is curved, and in the lower portion of the door hinge 32, a hinge shaft 40 may be disposed as the center of rotation of the door 11. The hinge shaft 40 may be disposed in the door hinge 32 installed on the hinge bracket 31. The one end of the door hinge 32 may be installed on the hinge bracket 31 of the door 11, and the other end of the door hinge 32 may be supported on a support protrusion 41 of the main body 10.

The hinge apparatus 30 may include a guide roller 34 accommodated in the hinge bracket 31 and rolling-contacting the guide surface 33 of the door hinge 32. The guide roller 34 may be disposed in a guide 37. The guide 37 may be movable in an up-down direction of the hinge bracket 31.

The guide 37 may be formed in the shape of a cylinder. In the lower end of the guide 37, the guide roller 34 may be provided to contact the guide surface 33 of the door hinge 32, and the upper end of the guide 37 may be supported on a support 36 disposed in the hinge bracket 31. The support 36 may be formed in at least a portion of the hinge bracket 31 such that the guide 37 penetrates the support 36.

Meanwhile, the hinge apparatus 30 may include a spring 35. The spring 35 may be disposed around the guide 37 to adjust a movement of the door 11 between the door hinge 32 and the guide 37.

In at least a portion of the hinge apparatus 30, a pressing portion 38 may be disposed. The pressing portion 38 may be disposed on the guide 37. The pressing portion 38 may include a bumper. The pressing portion 38 may be exposed to the outside of the door 11 through the opening 13 of the hinge bracket 31. The pressing portion 38 may press at least a portion of the damping assembly 100 which will be described later.

The door hinge 32 may further include a support bracket 39. The support bracket 39 may be disposed on the door hinge 32. The support bracket 39 may be rotatably disposed on the door hinge 32. The support bracket 39 may reinforce the strength of the door hinge 32, and further include a support bracket guide 39*a* extending upward to guide a movement of a first lever 120 of the damping assembly 100 which will be described later.

Meanwhile, the door 11 may rotate with respect to the main body 10 by the hinge apparatus 30 to selectively open or close the opening 13. In order to reduce abrasion, impacts, and noise that are caused by repetitive use of the door 11, the damping assembly 100 may be disposed in the main body 10 to buffer the door 11 when the door 11 is closed. The damping assembly 100 may be disposed between the main body 10 and the door 11.

Figure 4:
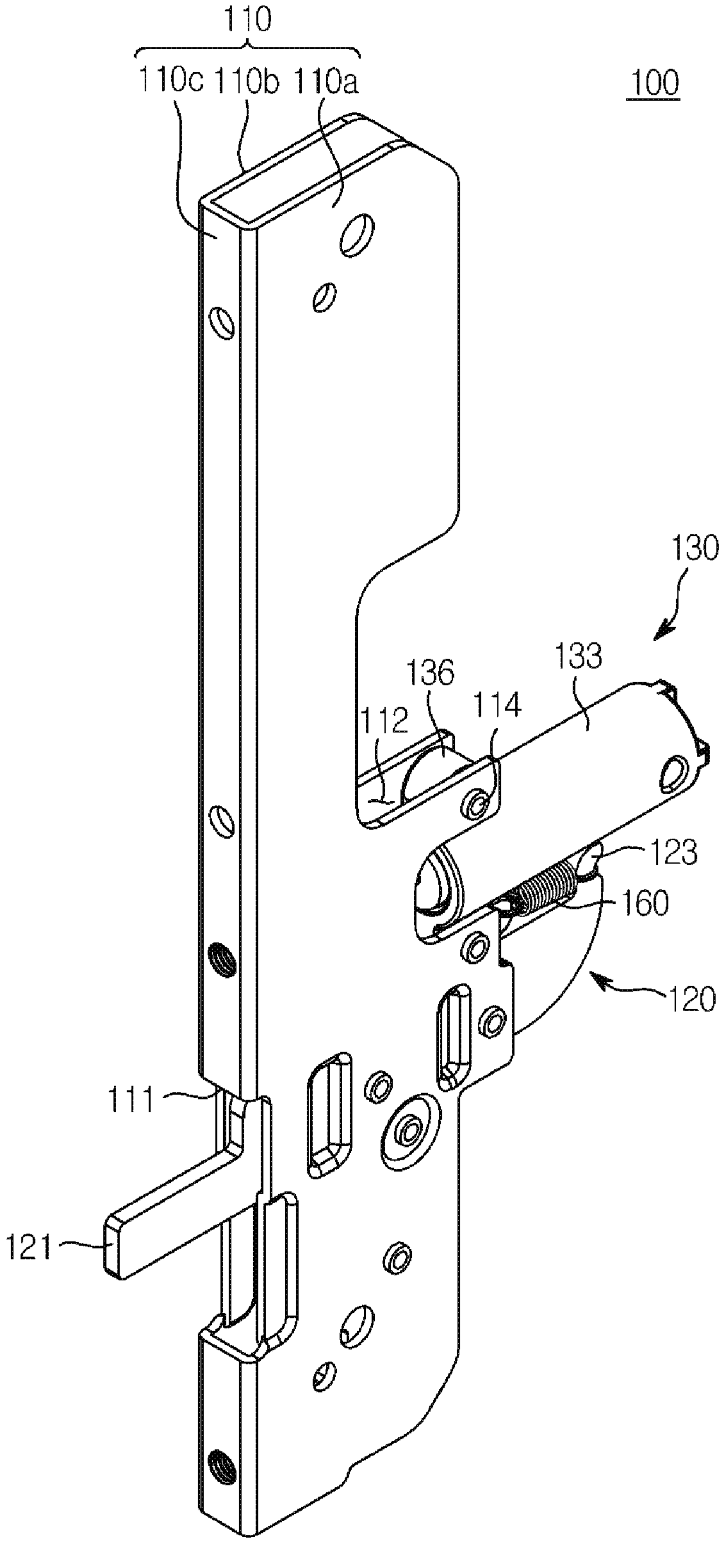
FIG. 4 is a perspective view of the damping assembly of the door, according to the first embodiment of the disclosure.
Figure 5:
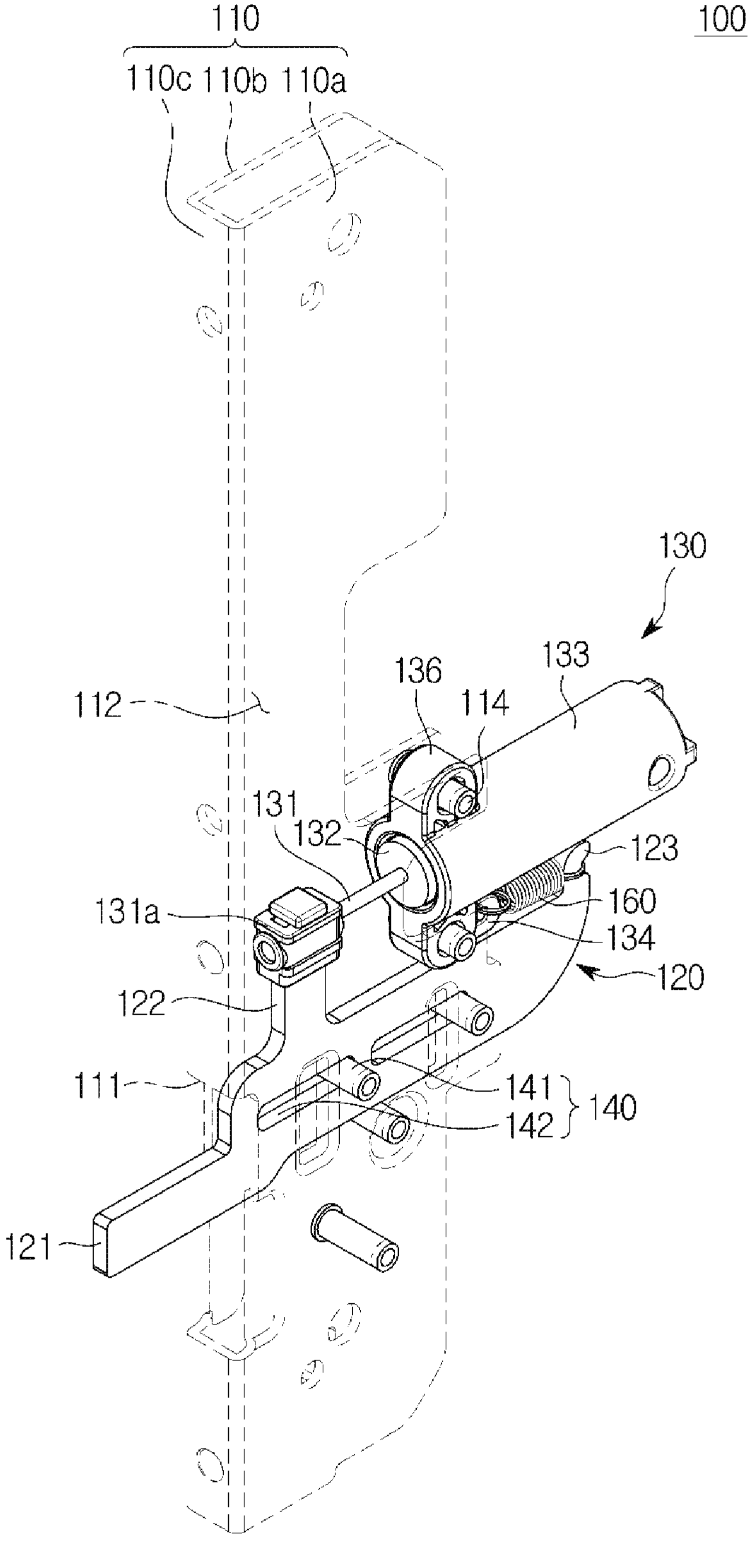
FIG. 5 is a partially exploded perspective view of the damping assembly of the door, according to the first embodiment of the disclosure.
Figure 6:
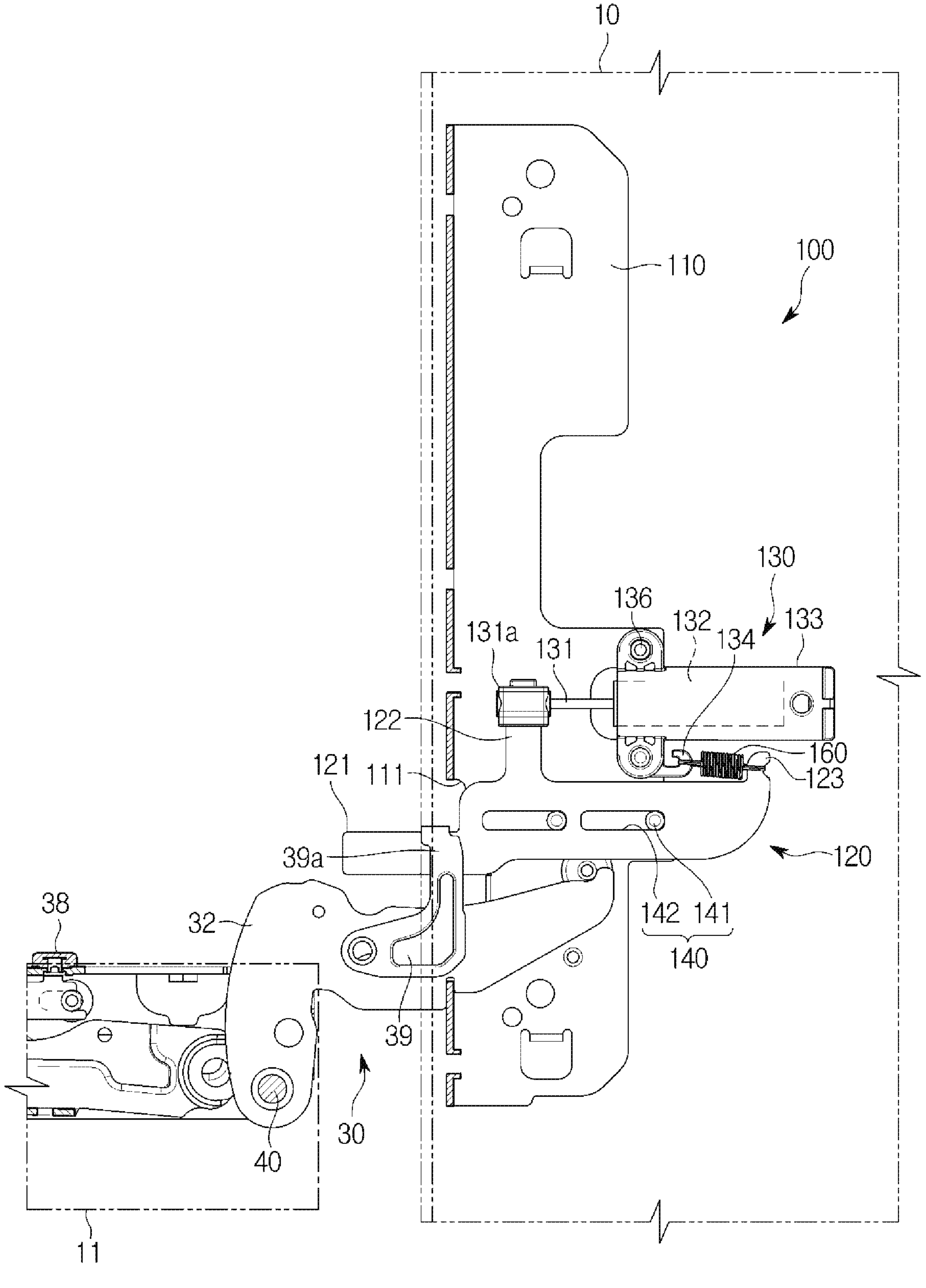
FIGS. 6 to 8 show an operation of the damping assembly, according to the first embodiment of the disclosure.
Figure 7:
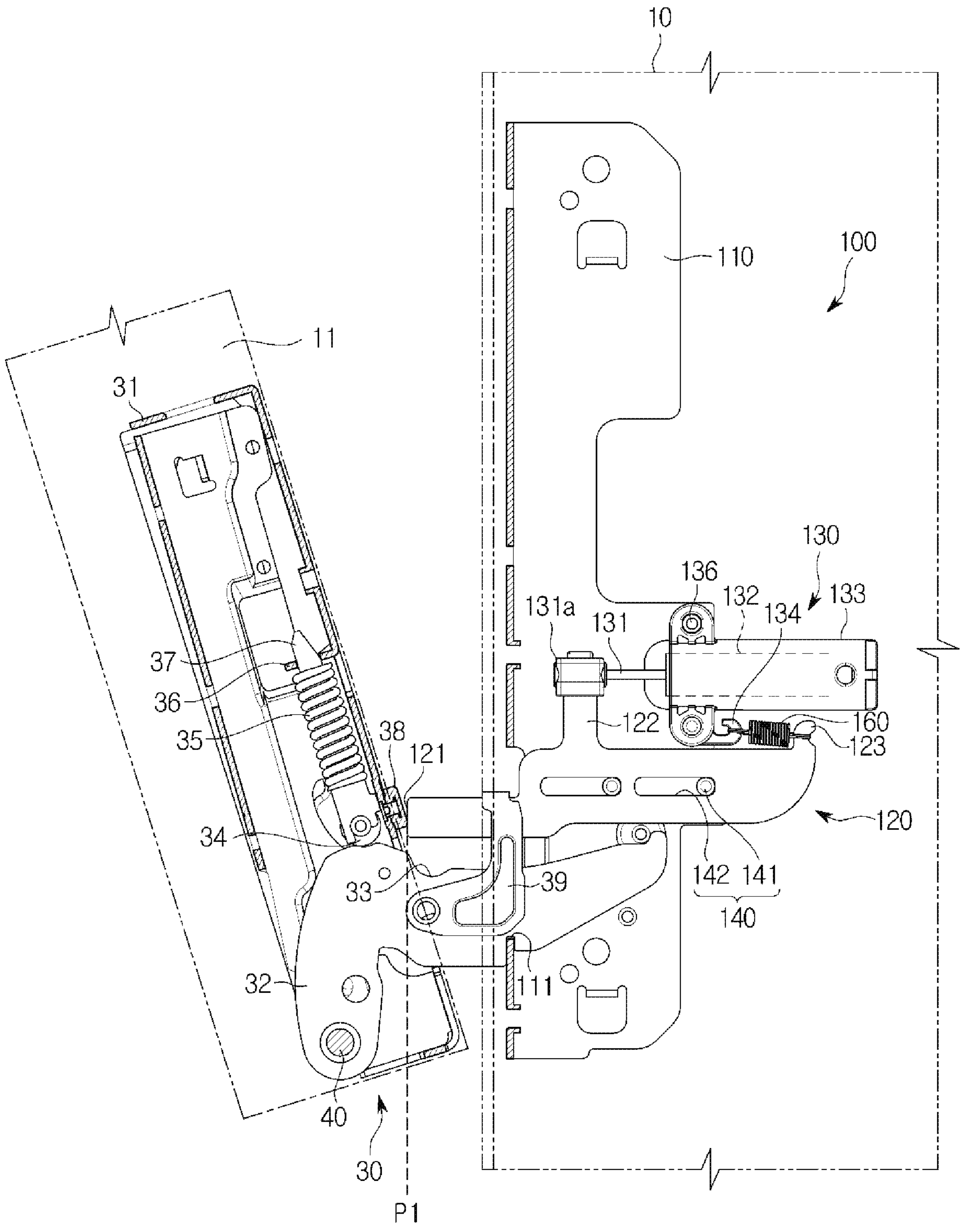
Figure 8:
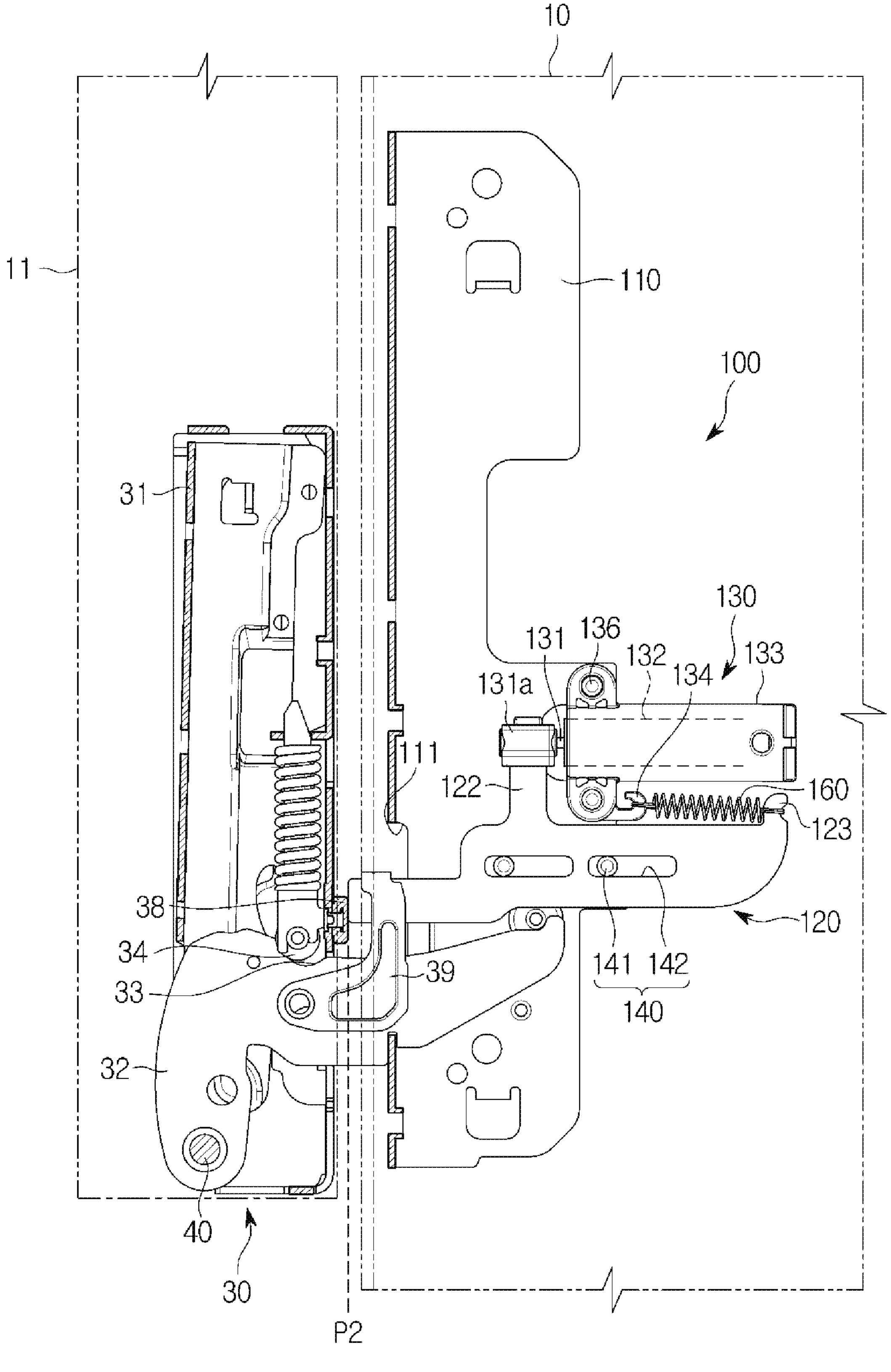

FIG. 4 is a perspective view of the damping assembly of the door, according to the first embodiment of the disclosure, FIG. 5 is a partially exploded perspective view of the damping assembly of the door, according to the first embodiment of the disclosure, and FIGS. 6 to 8 show an operation of the damping assembly, according to the first embodiment of the disclosure.

Referring to FIGS. 4 to 8, the damping assembly 100 may be installed in the main body 10. The damping assembly 100 may be disposed at the lower ends of both sides of the main body 10. The damping assembly 100 may include a damping bracket 110, the first lever 120 disposed in the damping bracket 110, and a damper 130 connected to the first lever 120.

The damping bracket 110 may include a first bracket 110*a* being in the shape of a plate, a second bracket 110*b* corresponding to the shape of the first bracket 110*a*, and a third bracket 110*c* connecting the first bracket 110*a* to the second bracket 110*b* and forming a front surface. The damping bracket 110 may include an accommodating space 112 which is formed by the first bracket 110*a*, the second bracket 110*b*, and the third bracket 110*c* and in which the damper 130 is installed.

In the front lower portion of the damping bracket 110, a first lever installing space 111 may be formed in which the first lever 120 is movably installed. The first lever installing space 111 may be formed by opening a part of the lower portion of the third bracket 110*c*.

In the first lever installing space 111 of the damping bracket 110, the first lever 120 may be movably installed.

The damper 130 connected to the first lever 120 may be positioned in parallel to a movement path of the first lever 120.

The damper 130 may include a piston rod (hereinafter, also referred to as a second lever 131) connected to the first lever 120, and a cylinder 132 connected to the second lever 131. The damper 130 may further include a cylinder housing 133 for accommodating the cylinder 132 and installing the cylinder 132 in the damping bracket 110.

The second lever 131 may be coupled to the cylinder 132. At one end of the second lever 131, a first lever connecting portion 131*a* for connecting to the first lever 120 may be disposed. The first lever connecting portion 131*a* may be formed in the shape of a hollow hexahedron whose one end is connected to the second lever 131. The upper and lower sides of the first lever connecting portion 131*a* may open such that the second lever 131 is inserted into the first lever connecting portion 131*a*.

The cylinder 132 may be accommodated in the cylinder housing 133 to be installed in the accommodating space 112 of the damping bracket 110. The cylinder housing 133 may include a cylinder housing installing portion 136 for fixing the cylinder housing 133 on the damping bracket 110. The cylinder housing installing portion 136 may be fixed at a damper installing portion 114 of the damping bracket 110. The damper installing portion 114 may be formed on the first bracket 110*a* and the second bracket 110*b* of the damping bracket 110.

The first lever 120 may be in the shape of a plate such that the first lever 120 is movably accommodated in the accommodating space 112 of the damping bracket 110. The first lever 120 may include a contact portion 121 at the front end to be pressed by the door 11, and a second lever connecting portion 122 connected to the second lever 131. The second lever connecting portion 122 may be formed by extending at least a portion of the first lever 120 upward.

The first lever 120 may move by a guide portion 140 with respect to the damping bracket 110. The guide portion 140 may include at least one guide protrusion 141 formed on the damping bracket 110, and at least one guide slit 142 formed in the first lever 120 to correspond to the at least one guide protrusion 141. The at least one guide slit 142 may be a long hole. The at least one guide slit 142 may be formed in parallel to a movement direction of the first lever 120.

The guide portion 140 may be disposed to correspond to the first lever installing space 111 of the damping bracket 110, and guide the first lever 120 to move.

The damping assembly 100 may further include an elastic member 160 connecting the first lever 120 to the damper 130. The elastic member 160 may be connected between the first lever 120 and the cylinder housing 133 of the damper 130. The first lever 120 may include a first elastic member connecting portion 123 extending upward at the rear upper end and connecting to the elastic member 160.

The cylinder housing 133 may include a second elastic member connecting portion 134 extending downward at the front lower end and connecting to the elastic member 160.

When the door 11 is not pressed, the elastic member 160 may compress the first lever 120 toward the cylinder housing 133 so that the first lever 120 moves to a first position P1. The elastic member 160 may compress between the first elastic member connecting portion 123 of the first lever 120 and the second elastic member connecting portion 134 of the cylinder housing 133.

Hereinafter, operations of the damping assembly 100 configured as described above will be described.

The door 11 may rotate on the hinge shaft 40 of the door hinge 32 disposed in the lower portion of the main body 10 to open.

At this time, the first lever 120 of the damping assembly 100 may move to the first position P1 by the elastic member 160. More specifically, the first lever 120 may move to the first position P1 through the first lever installing space 111 of the damping bracket 110 disposed in the main body 10.

When a user rotates the door 11 in order to close the door 11, the door 11 may rotate on the hinge shaft 40 of the door hinge 32 by the hinge apparatus 30 to move upward.

When the door 11 rotates to a predetermined angle or more, the guide roller 34 installed in the door 11 may contact the door hinge 32, and the spring 35 may be compressed. The guide roller 34 may move to the guide surface 33 of the door hinge 32.

If the pressing portion 38 installed on the guide 37 of the door 11 presses the contact portion 121 of the first lever 120, the first lever 120 may move. The first lever 120 may be guided by the guide portion 140, and thus move to a second position P2 by the door 11.

When the first lever 120 moves to the second position P2, the damper 130 connected to the first lever 120 may generate resistance in the opposite direction of the movement direction of the first lever 120.

At this time, the elastic member 160 may elastically support the first lever 120 and the cylinder housing 133. When pressure applied on the first lever 120 by the door 11 is removed, the elastic member 160 may elastically bias the first lever 120 so that the first lever 120 moves from the second position P2 to the first position P1.

Figure 9:
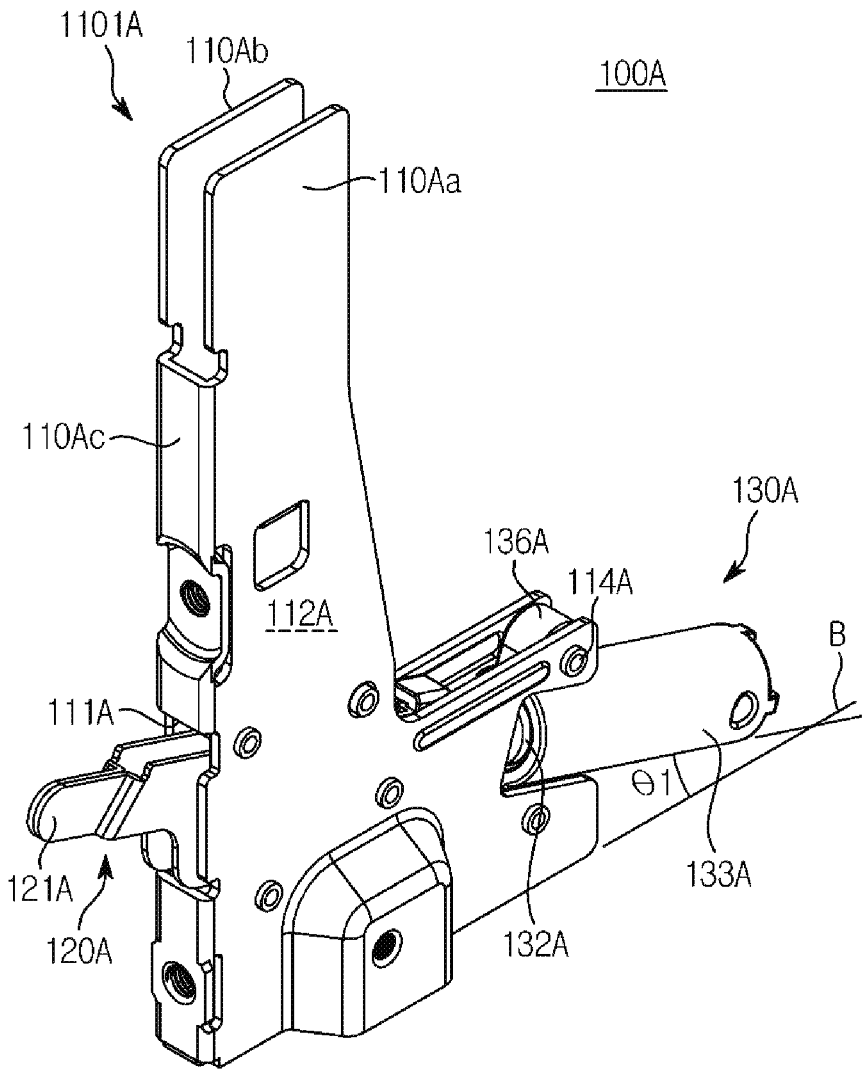
FIG. 9 is a perspective view of a damping assembly of a door, according to a second embodiment of the disclosure.
Figure 10:
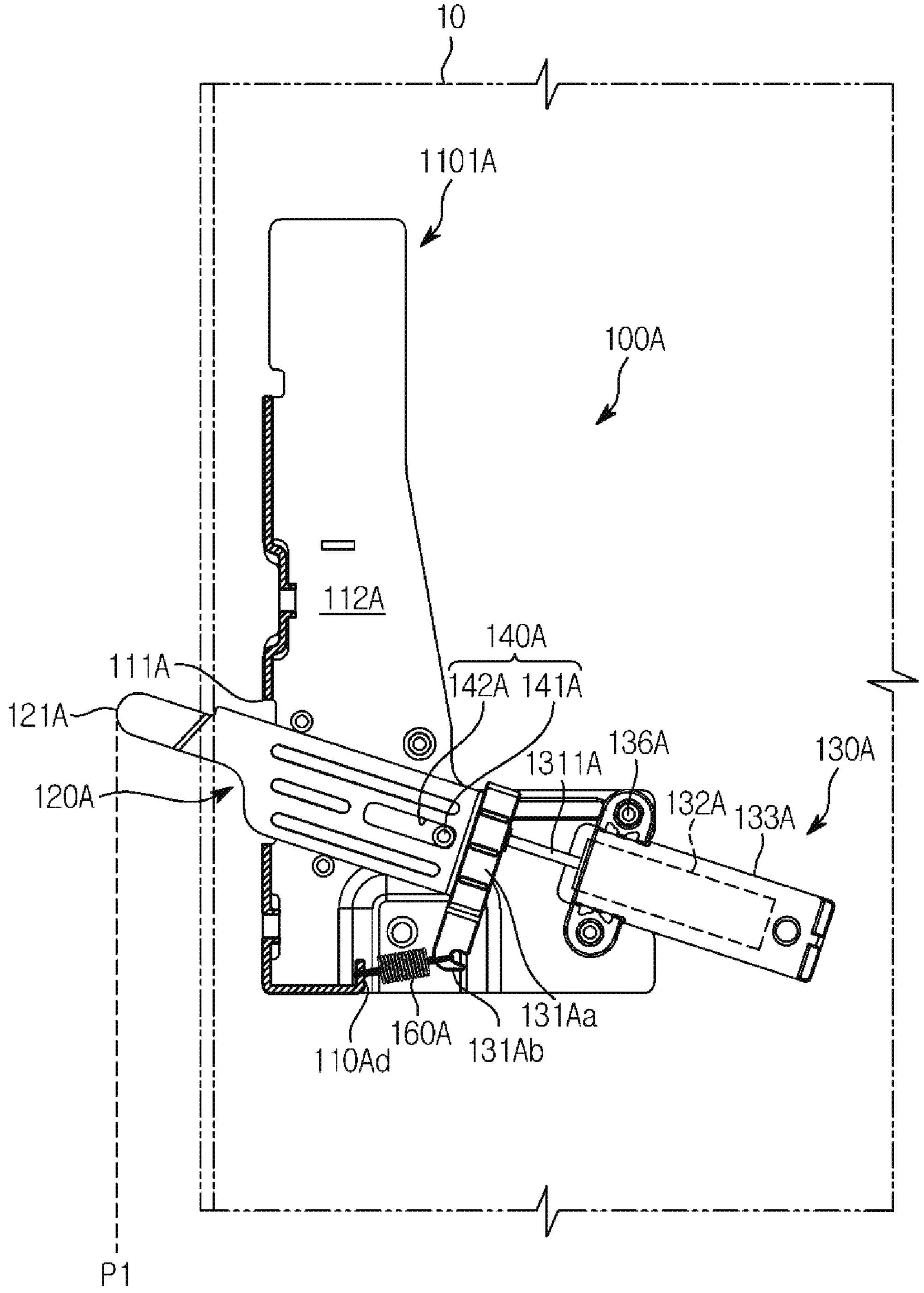
FIGS. 10 and 11 show an operation of the damping assembly, according to the second embodiment of the disclosure.
Figure 11:
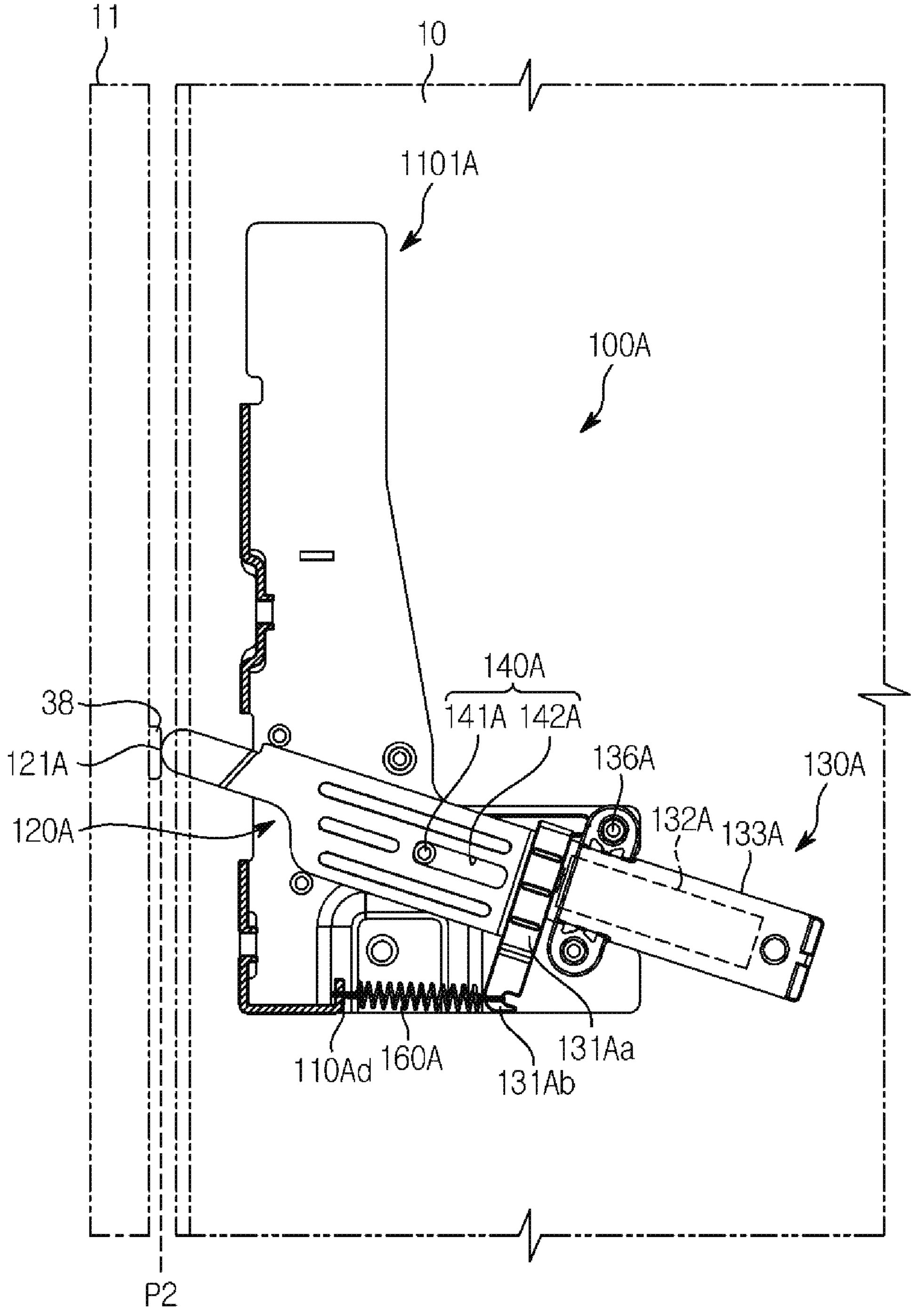

FIG. 9 is a perspective view of a damping assembly of a door, according to a second embodiment of the disclosure, and FIGS. 10 and 11 show an operation of the damping assembly, according to the second embodiment of the disclosure. Reference numerals not shown in FIGS. 9 to 11 will be able to be understood by referring to FIGS. 1 to 8.

Referring to FIGS. 9 to 11, a damping assembly 100A may be installed in the main body 10.

The damping assembly 100A may include a damping bracket 1101A, a first lever 120A disposed in the damping bracket 1101A, and a damper 130A connected to the rear portion of the first lever 120A.

The damping bracket 1101A may include a first bracket a formed in the shape of a plate, a second bracket 110Ab corresponding to the shape of the first bracket 110Aa, and a third bracket 110Ac connecting the first bracket 110Aa to the second bracket 110Ab and forming a front surface. The damping bracket 1101A may include an accommodating space 112A which is formed by the first bracket 110Aa, the second bracket 110Ab, and the third bracket 110Ac and in which the first lever 120A and the damper 130 are installed.

In the front lower portion of the damping bracket 1101A, a first lever installing space 111A may be formed in which the first lever 120A is movably installed. The first lever installing space 111A may be formed by opening a part of the lower portion of the third bracket 110Ac. In the first lever installing space 111A of the damping bracket 1101A, the first lever 120A may be movably installed.

The damper 130A connected to the first lever 120A may be disposed behind the first lever 120A in such a way to be in parallel to a movement path of the first lever 120A.

The damper 130A may include a second lever 1311A movably connected to the first lever 120A, a cylinder 132A connected to the second lever 1311A, and a cylinder housing 133A for accommodating the cylinder 132A and installing the cylinder 132A in the damping bracket 1101A.

In this case, the first lever 120A may be inclined at a predetermined angle θ1 with respect to a bottom B of the main body 10.

The first lever 120A may be accommodated in the accommodating space 112A of the damping bracket 1101A, and move in the accommodation space 112A. The first lever 120A may include a contact portion 121A at the front end to be pressed by the door 11. The rear end of the first lever 120A may be connected to the second lever 1311A. The second lever 1311A may include a first lever connecting portion 131Aa that is coupled with the first lever 120A.

The first lever 120A may move by a guide portion 140A with respect to the damping bracket 1101A. The guide portion 140A may include at least one guide protrusion 141A formed on the damping bracket 1101A, and a guide slit 142A formed in the first lever 120A and guided by the at least one guide protrusion 141A of the damping bracket 1101A. The guide slit 142A may be a long hole. The guide slit 142A may be formed in parallel to a movement direction of the first lever 120A. The guide slit 142A may be formed with a first angle θ.

Also, the at least one guide protrusion 141A of the damping bracket 1101A may guide a movement of the first lever 120A from the upper portion of the first lever 120A to the lower portion of the first lever 120A.

Meanwhile, the second lever 1311A may be coupled to the cylinder 132A in such a way to be movable by the cylinder 132A. The cylinder 132A may be accommodated in the cylinder housing 133A, and a cylinder housing installing portion 136A for fixing the cylinder housing 133A on the damping bracket 1101A may be provided. The cylinder housing installing portion 136A may be fixed at a damper installing portion 114A of the damping bracket 1101A. The damper installing portion 114A may be disposed at the lower portions of the first bracket 110Aa and the second bracket 110Ab of the damping bracket 1101A.

The damping assembly 100A may include an elastic member 160A connecting the damping bracket 1101A to the damper 130.

The elastic member 160A may connect the damping bracket 1101A to the second lever 1311A of the damper 130A. At the lower end of the damping bracket 1101A, a first elastic member connecting portion 110Ad to which the elastic member 160A is connected may be formed.

The second lever 1311A of the damper 130A may include a second elastic member connecting portion 131Ab at the front lower portion such that the elastic member 160A is connected to the second elastic member connecting portion 131Ab. The second elastic member connecting portion 131Ab may be formed at the lower end of the first lever connecting portion 131Aa of the second lever 1311A.

When the door 11 is not pressed, the elastic member 160A may compress the first lever 120A toward the damping bracket 1101A so that the first lever 120A moves to the first position P1.

In contrast, when the door 11 is pressed, the pressing portion 38 of the door 11 may press the contact portion 121A of the first lever 120A, and then, the first lever 120A may move to the second position P2.

When the first lever 120A moves to the second position P2, the damper 130A connected to the rear portion of the first lever 120A may generates resistance in the opposite direction of the movement direction of the first lever 120A.

Details about the structure and operations of the damping assembly 100A with the above-described configuration will be able to be understood sufficiently from the above description, and therefore, overlapping descriptions thereof will be omitted.

Figure 12:
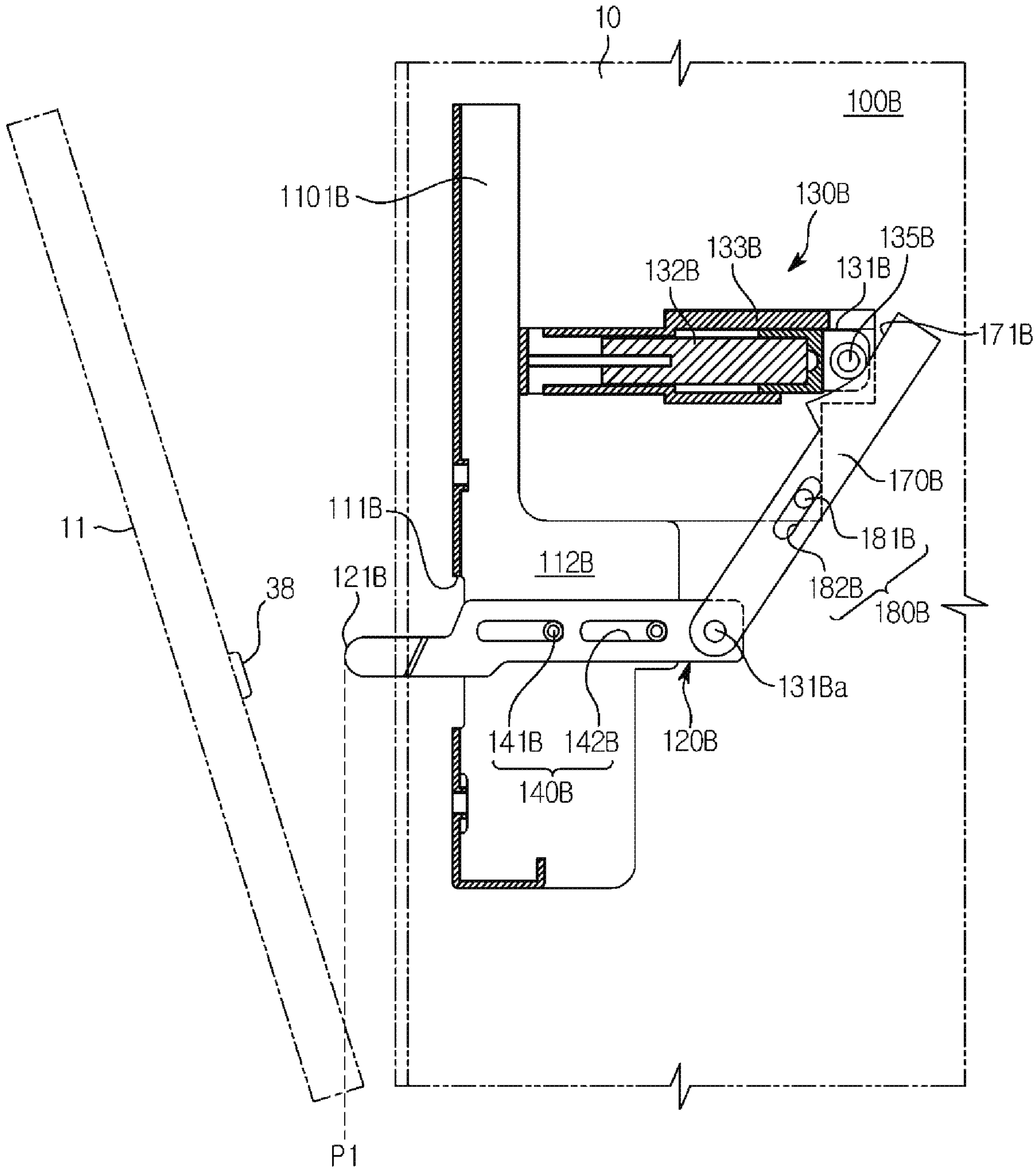
FIGS. 12 and 13 show a damping assembly and an operation of the damping assembly, according to a third embodiment of the disclosure.
Figure 13:
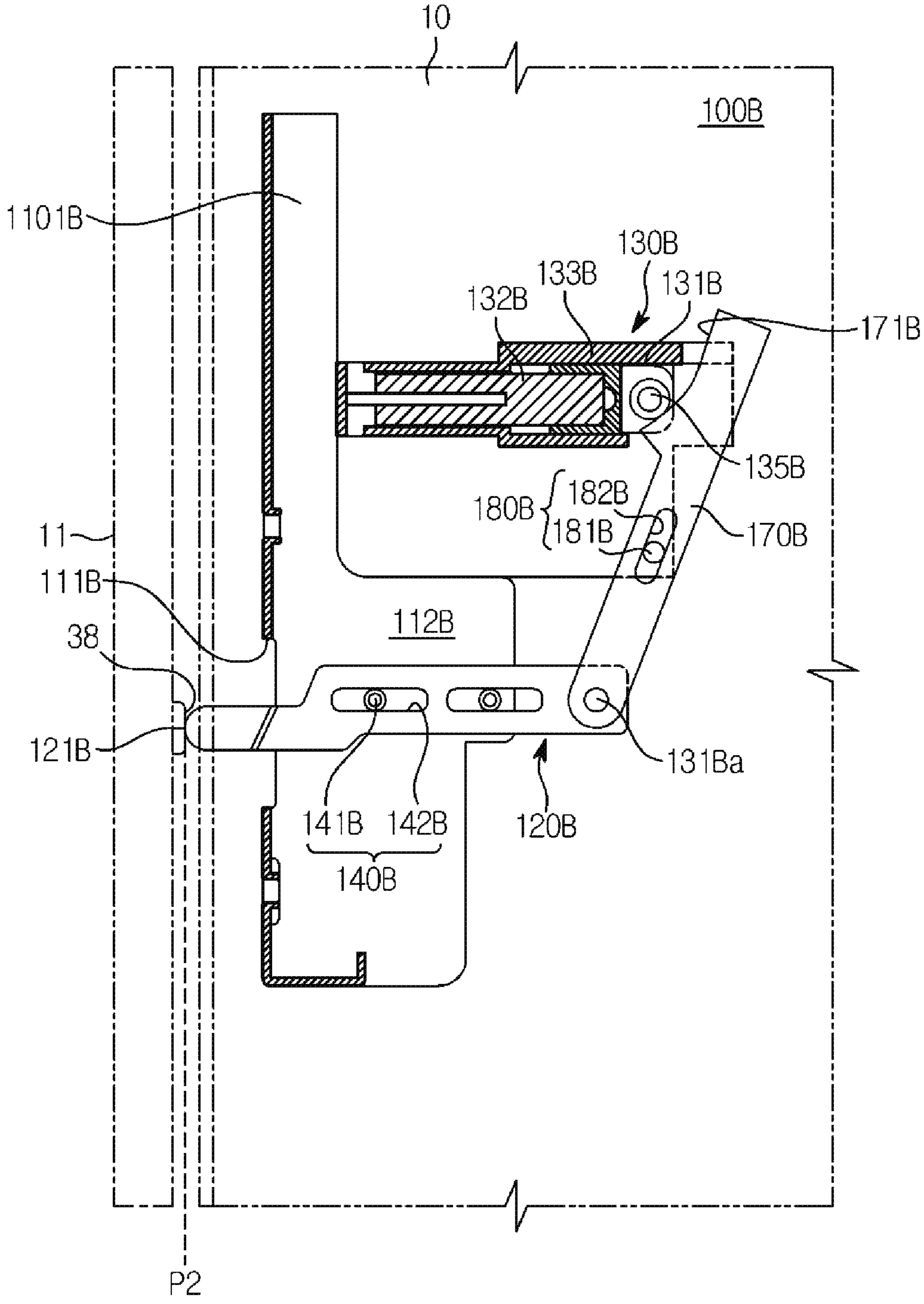

FIGS. 12 and 13 show a damping assembly and an operation of the damping assembly, according to a third embodiment of the disclosure. Reference numerals not shown in FIGS. 12 and 13 will be able to be understood by referring to FIGS. 1 to 8.

Referring to FIGS. 12 and 13, a damping assembly 100B may be installed in the main body 10.

The damping assembly 100B may include a damping bracket 1101B, a first lever 120B disposed in the damping bracket 110, and a damper 130B connected to the rear portion of the first lever 120B.

The damping bracket 1101B may include an accommodating space 112B in which the first lever 120B and the damper 130B are installed.

In the front lower portion of the damping bracket 1101B, a first lever installing space 111B may be formed in which the first lever 120B is installed to be movable in the front-back direction.

The damper 130B connected to the first lever 120B may be disposed above the first lever 120B in parallel to a movement path of the first lever 120B.

The damper 130B may include a second lever 131B connected to the first lever 120B by a connection link 170B to be movable, a cylinder 132B connected to the second lever 131B, and a cylinder housing 133B for accommodating the cylinder 132B and installing the cylinder 132B in the damping bracket 1101B.

The first lever 120B may be accommodated in the accommodating space 112B of the damping bracket 1101B to be movable in the front-back direction. The first lever 120B may include a contact portion 121*b* at the front end to be pressed by the pressing portion 38 of the door 11.

At the rear end of the first lever 120B, a first lever connecting portion 131Ba may be formed to rotatably connect to the connection link 170B.

One end of the connection link 170B may be rotatably connected to the first lever connecting portion 131Ba of the first lever 120B, and at the other end of the connection link 170B, a connection link guide surface 171B may be formed in a curved shape. The connection link guide surface 171B may be connected to the second lever 131B to guide the second lever 131B to move simultaneously with a movement of the first lever 120B.

Meanwhile, the connection link 170B may include a connection link guide portion 180B to guide and support a movement of the connection link 170B. The connection link guide portion 180B may include a connection link guide protrusion 181B and a connection link guide slot 182B formed to correspond to the connection link guide protrusion 181*b*. The connection link guide slot 182B may be a long hole. The connection link guide slot 182B may be supported by the connection link guide protrusion 181B to support a movement of the connection link 170B.

The second lever 131B may be supported by the connection link guide surface 171B of the connection link 170B. The second lever 131B may include a second lever guide 135B that is supported on the connection link guide surface 171B. The second lever guide 135B may move the second lever 131B in the front-back direction on the connection link guide surface 171B.

The first lever 120B may move by a guide portion 140B in the damping bracket 1101B. The guide portion 140B may include at least one guide protrusion 141B formed on the damping bracket 1101B, and a guide slit 142B formed in the first lever 120B and guided by the at least one guide protrusion 141B of the damping bracket 1101B. The guide slit 142B may be a long hole. The guide slit 142B may be formed in parallel to a movement direction of the first lever 120B.

Meanwhile, the second lever 131B may be coupled the cylinder 132B. The cylinder 132B may be accommodated in the cylinder housing 133B.

When the door 11 is not pressed, the first lever 120B may be located at the first position P1.

In contrast, when the door 11 is pressed, the pressing portion 38 of the door 11 may press the contact portion 121B of the first lever 120B, and then, the first lever 120B may move to the second position P2.

When the first lever 120B moves to the second position P2, the damper 130B connected to the rear portion of the first lever 120B and located above the first lever 120B may generate resistance in the opposite direction of the movement direction of the first lever 120B.

Details about the structure and operations of the damping assembly 100B with the above-described configuration will be able to be understood sufficiently from the above description, and therefore, overlapping descriptions thereof will be omitted.

Figure 14:
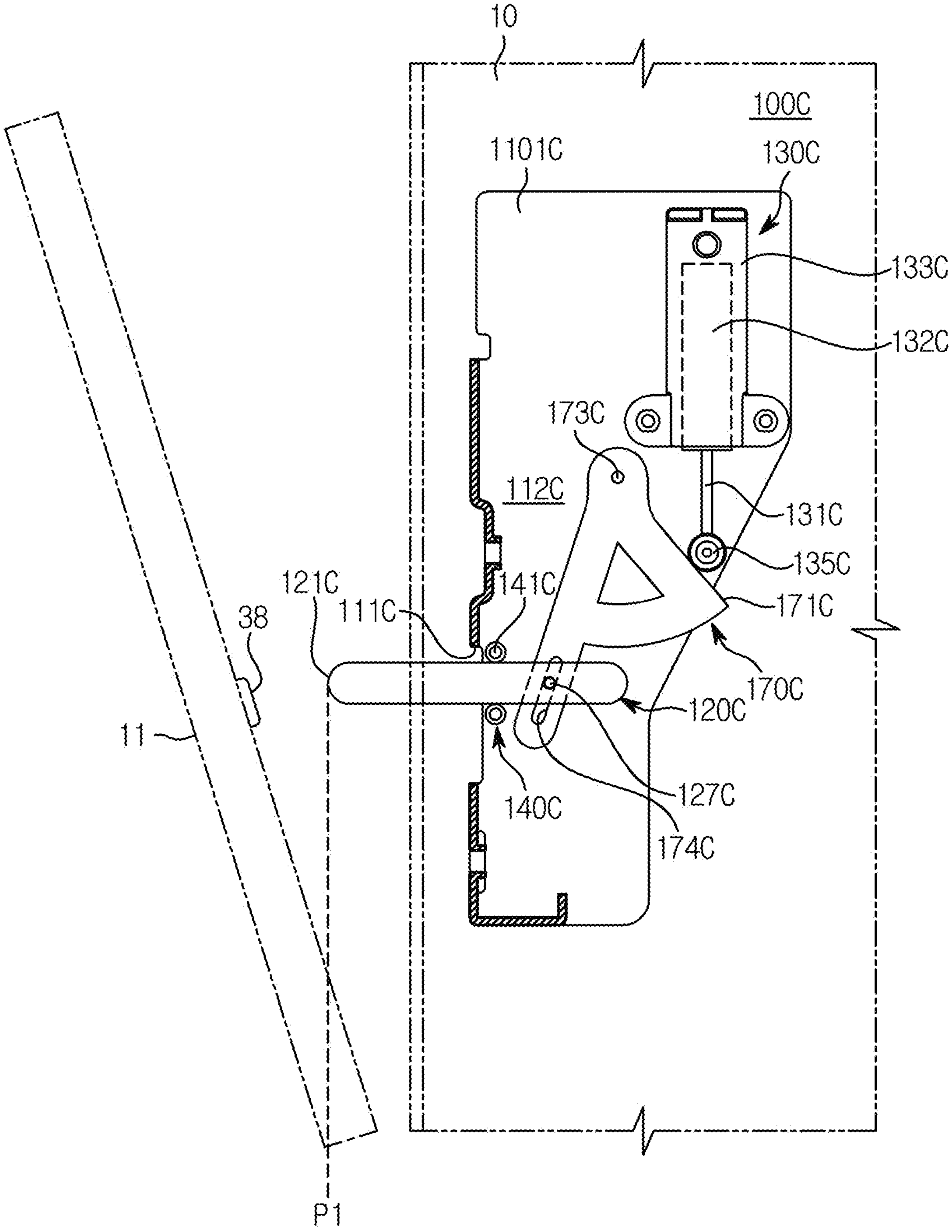
FIGS. 14 and 15 show a damping assembly and an operation of the damping assembly, according to a fourth embodiment of the disclosure.
Figure 15:
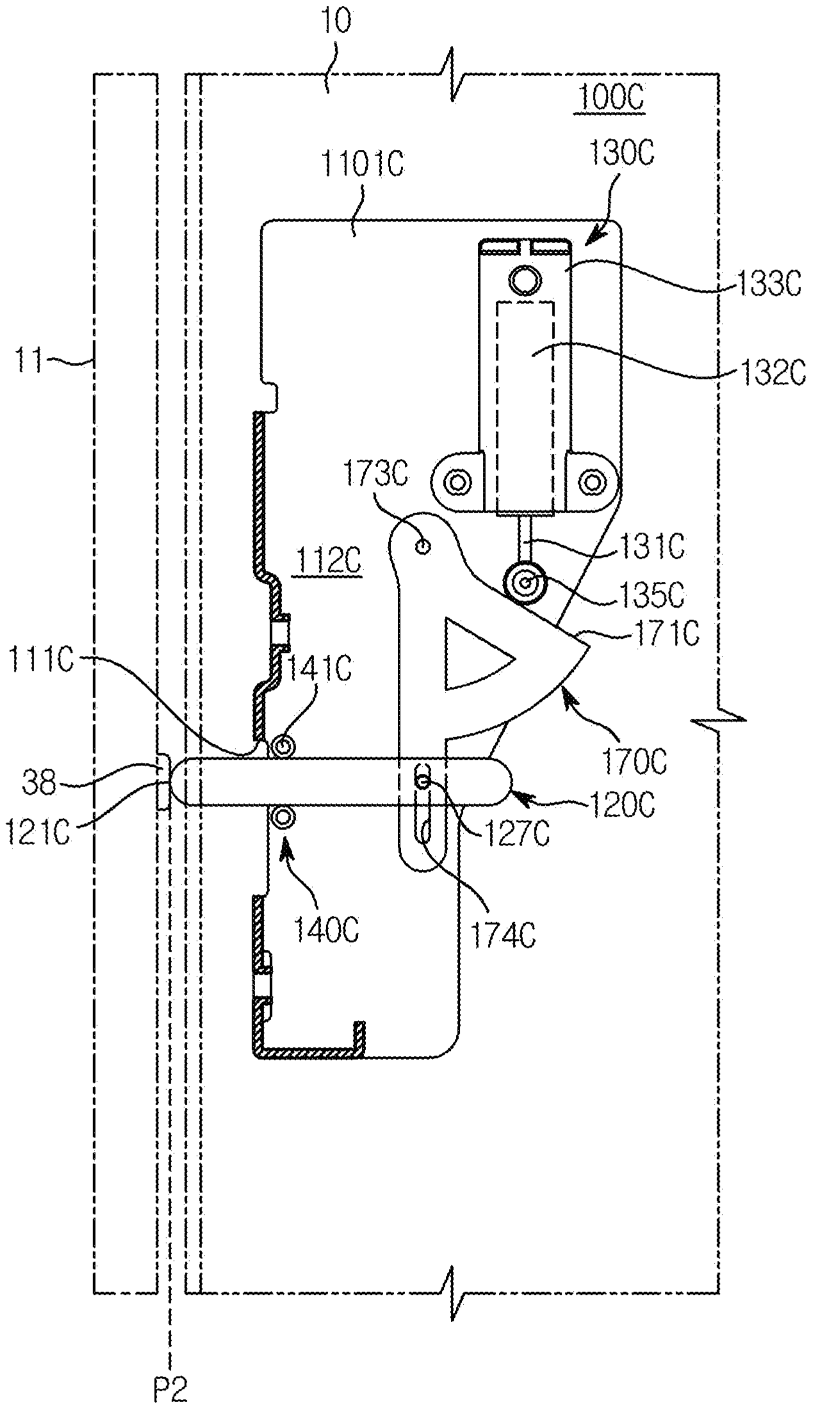

FIGS. 14 and 15 show a damping assembly and an operation of the damping assembly, according to a fourth embodiment of the disclosure. Reference numerals not shown in FIGS. 14 and 15 will be able to be understood by referring to FIGS. 1 to 8.

Referring to FIGS. 14 and 15, a damping assembly 100C may be installed in the main body 10.

The damping assembly 100C may include a damping bracket 1101C, a first lever 120C disposed in the damping bracket 1101C, and a damper 130C connected to the rear portion of the first lever 120C and located above the first lever 120C.

The damping bracket 1101C may include an accommodating space 112C in which the first lever 120C and the damper 130C are installed.

In the front lower portion of the damping bracket 1101C, a first lever installing space 111C in which the first lever 120C is installed to be movable in the front-back direction may open.

The damper 130C connected to the first lever 120C may be disposed behind and above the first lever 120C in such a way to move linearly in a direction that is vertical to a movement path of the first lever 120C.

The damper 130C may include a second lever 131C connected to the first lever 120C by a connection link 170C to be movable vertically, a cylinder 132C connected to the second lever 131C, and a cylinder housing 133C for accommodating the cylinder 132C and installing the cylinder 132C in the damping bracket 1101C.

The first lever 120C may be accommodated in the accommodating space 112C of the damping bracket 1101C to be movable in the front-back direction. The first lever 120C may include a contact portion 121C at the front end to be pressed by the pressing portion 38 of the door 11.

At the rear end of the first lever 120C, a first lever connecting protrusion 127C may be formed to movably connect to the connection link 170C.

One end of the connection link 170C may be movably connected to the first lever connecting protrusion 127C of the first lever 120C, and at the other end of the connection link 170C, a connection link guide surface 171C may be formed to guide the second lever 131C to move when the first lever 120C moves. The connection link guide surface 171C may be connected to the second lever 131C, and guide the second lever 131C to move simultaneously with a movement of the first lever 120C.

At the top end of the connection link 170C, a connection link rotating shaft 173C may be disposed such that the connection link 170C rotates simultaneously with a movement of the first lever 120C. One lower end of the connection link 170C with respect to the connection link rotating shaft 173C of the connection link 170C may be connected to the first lever 120C, and the other lower end of the connection link 170C may be connected to the second lever 131C to transfer a movement of the first lever 120C to the second lever 131C.

Meanwhile, in the connection link 170C, a connection link guide slot 174C may be formed to guide the connection link 170C to move simultaneously with a movement of the first lever 120C. The connection link guide slot 174C may be formed to correspond to the first lever connecting protrusion 127C. The connection link guide slot 174C may be a long hole. The connection link guide slot 174C may be supported by the first lever connecting protrusion 127C to support a movement of the connection link 170C.

The second lever 131C may be supported by the connection link guide surface 171C of the connection link 170C. The second lever 131C may include a second lever guide 135C supported on the connection link guide surface 171C.

The second lever guide 135C may move on the connection link guide surface 171C to move the second lever 131C in the up-down direction.

The first lever 120C may move by a guide portion 140C with respect to the damping bracket 1101C. The guide portion 140C may include at least one guide protrusion 141C formed on the damping bracket 1101B. The at least one guide protrusion 141C may be disposed above and below the front end of the first lever 120C to support a movement of the first lever 120C.

The second lever 131C may be accommodated in the cylinder housing 133C to be movable by the cylinder 132C.

Meanwhile, when the door 11 is not pressed, the first lever 120C may be located at the first position P1, and when the door 11 is pressed, the pressing portion 38 of the door 11 may press the contact portion 121C of the first lever 120C, and then, the first lever 120C may move to the second position P2.

When the first lever 120C moves to the second position P2, the second lever 131C of the damper 130C connected to the rear portion of the first lever 120C and located above the first lever 120C may generate resistance by the connection link 170C in a direction that is vertical to the movement direction of the first lever 120C.

Details about the structure and operations of the damping assembly 100C with the above-described configuration will be able to be understood sufficiently from the above description, and therefore, overlapping descriptions thereof will be omitted.

Figure 16:
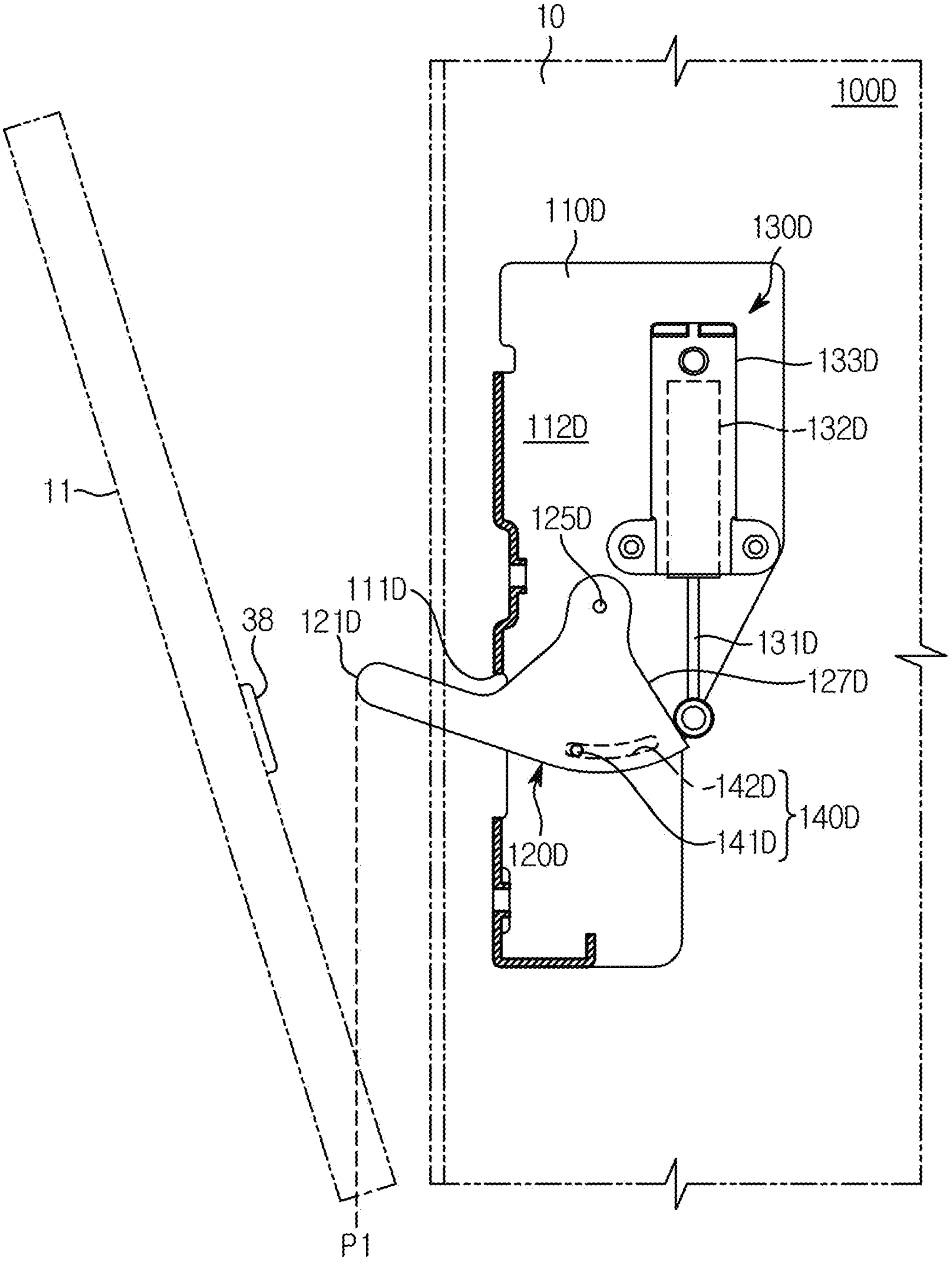
FIGS. 16 and 17 show a damping assembly and an operation of the damping assembly, according to a fifth embodiment of the disclosure.
Figure 17:
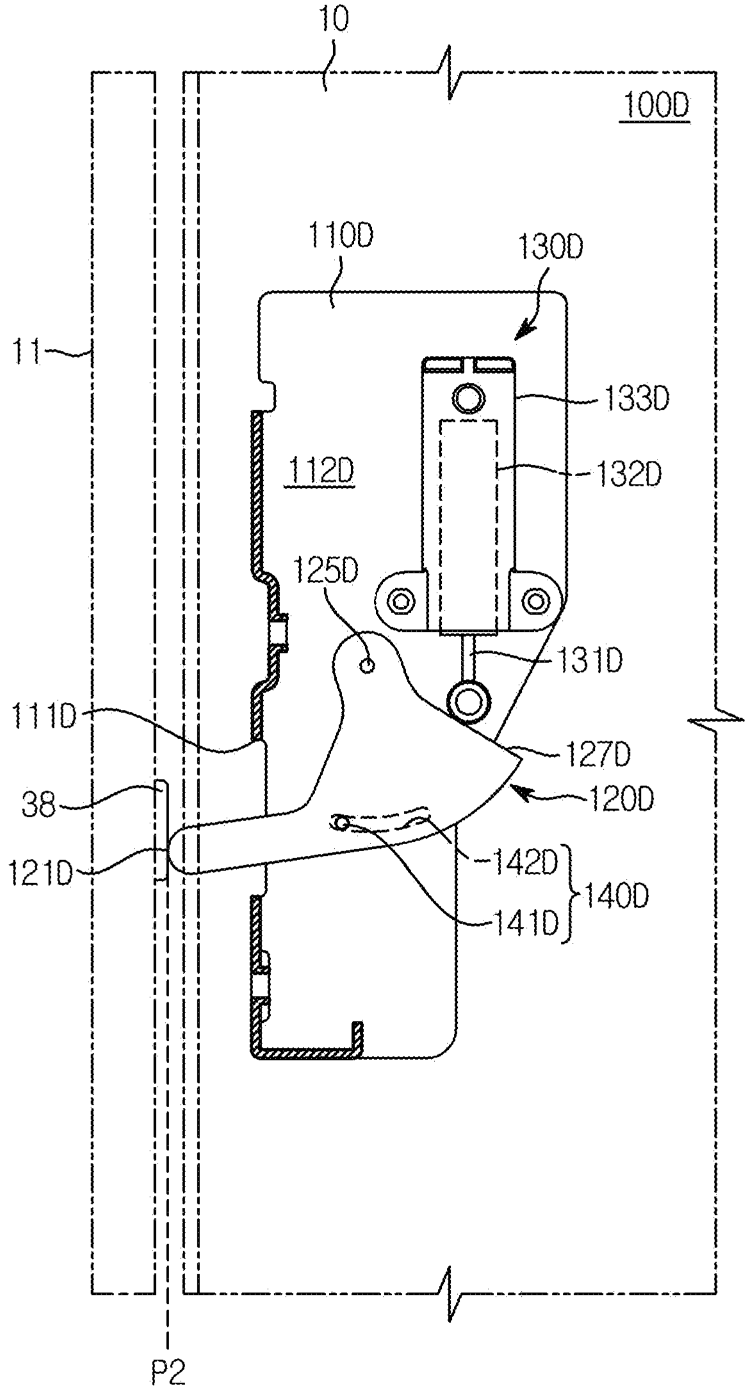

FIGS. 16 and 17 show a damping assembly and an operation of the damping assembly, according to a fifth embodiment of the disclosure. Reference numerals not shown in FIGS. 16 and 17 will be able to be understood by referring to FIGS. 1 to 8.

Referring to FIGS. 16 and 17, a damping assembly 100D may be installed in the main body 10.

The damping assembly 100D may include a damping bracket 110D, a first lever 120D disposed in the damping bracket 110D, and a damper 130D connected to the rear portion of the first lever 120D and disposed above the first lever 120D.

The damping bracket 110D may include an accommodating space 112D in which the first lever 120D and the damper 130D are installed.

In the front lower portion of the damping bracket 110D, a first lever installing space 111D in which the first lever 120D is installed to be movable in the front-back direction may open.

The damper 130D connected to the first lever 120D may be disposed behind and above the first lever 120D to move linearly in a direction that is vertical to a movement path of the first lever 120D.

The damper 130D may include a second lever 131D connected to the first lever 120D to be movable vertically, a cylinder 132D connected to the second lever 131D, and a cylinder housing 133D for accommodating the cylinder 132D and installing the cylinder 132D in the damping bracket 110D.

The first lever 120D may be accommodated in the accommodating space 112D of the damping bracket 110D in such a way to be movable in the front-back direction. The first lever 120D may include a contact portion 121D at the front end to be pressed by the pressing portion 38 of the door 11.

At the top end of the first lever 120D, a first lever rotating shaft 125D may be disposed to rotate the first lever 120D. At one end of the first lever 120D, a first lever guide surface 127D may be formed to guide the second lever 131D to move vertically simultaneously with a movement of the first lever 120D.

The first lever guide surface 127D may be connected to the second lever 131D, and guide the second lever 131D to move linearly simultaneously with a movement of the first lever 120D.

Meanwhile, the first lever 120D may be supported by a guide portion 140D to move. The guide portion 140D may include a guide protrusion 141D formed on the damping bracket 110D, and a guide slot 142D formed in the first lever 120D to correspond to the guide protrusion 141D. The guide slot 142D may be a long hole. The guide slot 142D may guide the first lever 120D to rotate with respect to the first lever rotating shaft 125D.

The second lever 131D may be accommodated in the cylinder housing 133D in such a way to be movable vertically by the cylinder 132D.

Meanwhile, when the door 11 is not pressed, the first lever 120D may be located at the first position P1, and when the door 11 is pressed, the pressing portion 38 of the door 11 may press the contact portion 121D of the first lever 120D, and then, the first lever 120D may move to the second position P2.

When the first lever 120D moves to the second position P2, the second lever 131D of the damper 130D connected to the rear portion of the first lever 120D and located above the first lever 120D may generate resistance in a direction that is vertical to the movement direction of the first lever 120D.

Details about the structure and operations of the damping assembly 100D with the above-described configuration will be able to be understood sufficiently from the above description, and therefore, overlapping descriptions thereof will be omitted.

Figure 18:
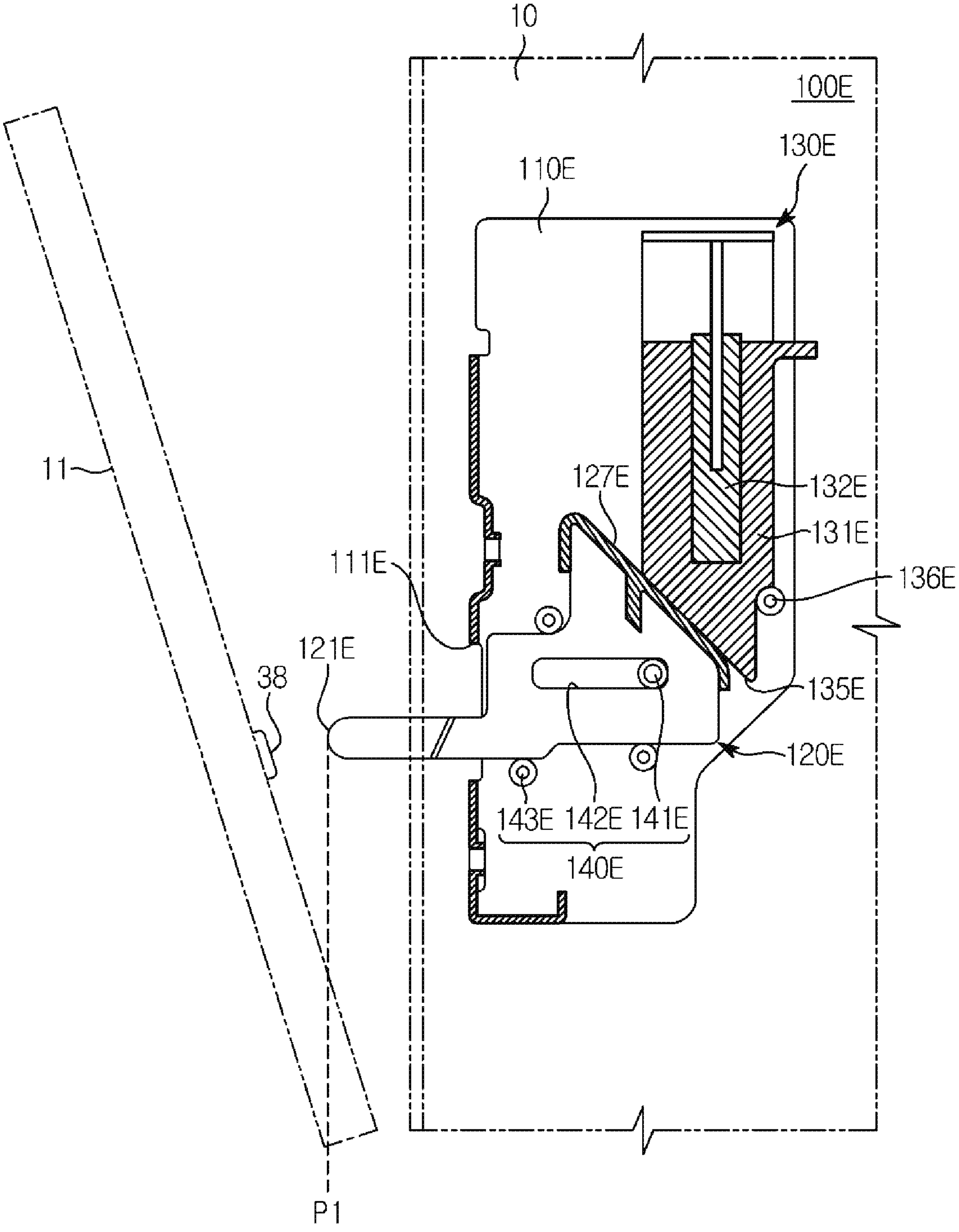
FIGS. 18 and 19 show a damping assembly and an operation of the damping assembly, according to a sixth embodiment of the disclosure.
Figure 19:
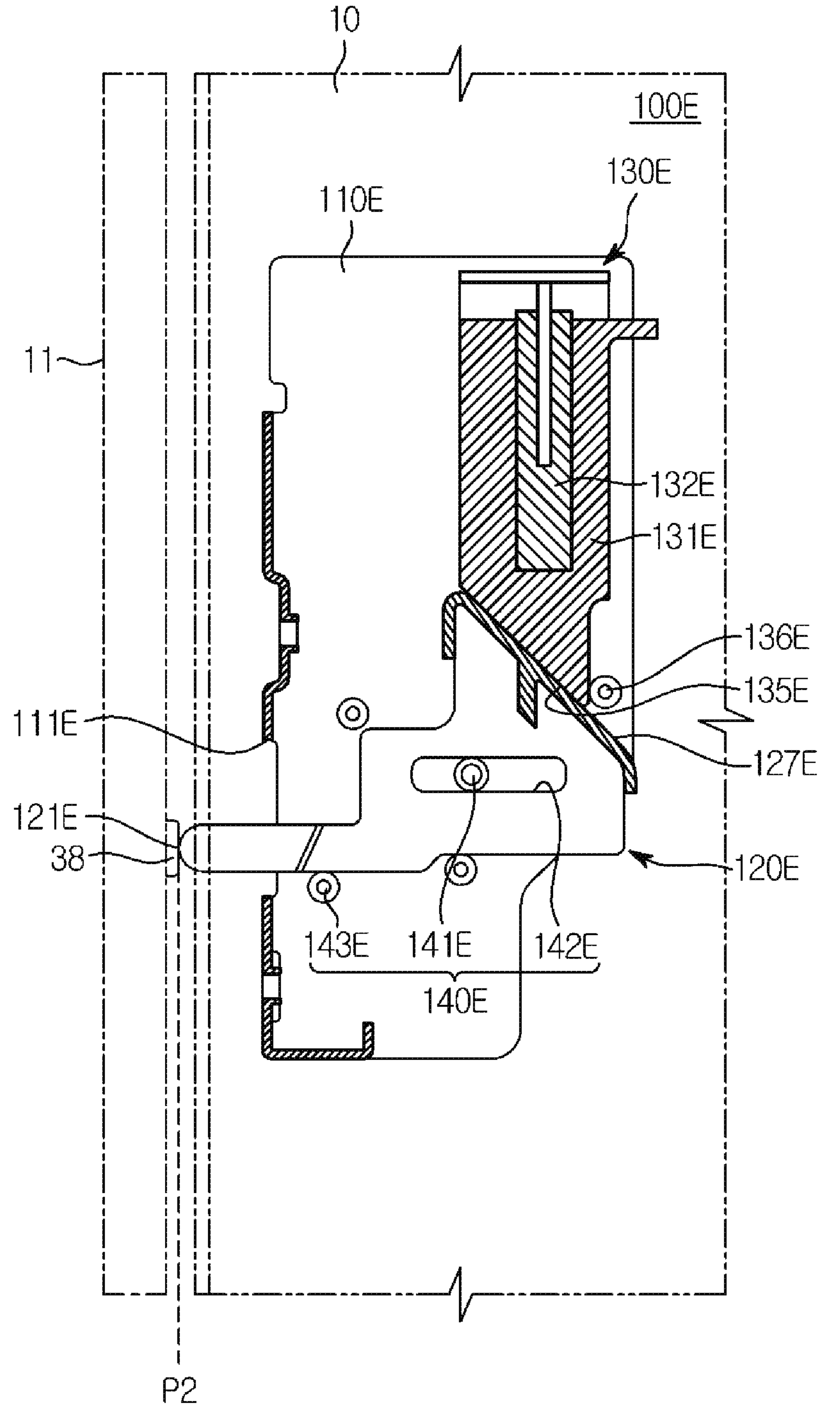

FIGS. 18 and 19 show a damping assembly and an operation of the damping assembly, according to a sixth embodiment of the disclosure. Reference numerals not shown in FIGS. 18 and 19 will be able to be understood by referring to FIGS. 1 to 8.

Referring to FIGS. 18 and 19, a damping assembly 100E may be installed in the main body 10.

The damping assembly 100E may include a damping bracket 110E, a first lever 120E disposed in the damping bracket 110E, and a damper 130E connected to the rear portion of the first lever 120E and disposed above the first lever 120E.

In the front lower portion of the damping bracket 110E, a first lever installing space 111E in which the first lever 120E is installed to be movable in the front-back direction may open.

The damper 130E connected to the first lever 120E may be disposed behind and above the first lever 120E to move linearly in a direction that is vertical to a movement path of the first lever 120E.

The damper 130E may include a second lever 131E connected to the first lever 120E to be movable vertically, and a cylinder 132E connected to the second lever 131E.

The second lever 131E may include a second lever guide surface 135E at the lower end, wherein the second lever guide surface 135E may be inclined. The second lever 131E may be guided by a second lever guide protrusion 136E for supporting the outer surface of the second lever 131E to move.

The first lever 120E may be movable in the front-back direction. The first lever 120E may include a contact portion 121E at the front end to be pressed by the pressing portion 38 of the door 11.

At the rear end of the first lever 120E, a first lever guide surface 127E may be formed with an inclination to guide the second lever 131E to move vertically simultaneously with a movement of the first lever 120E. The first lever guide surface 127E may be shaped to correspond to the second lever guide surface 135E.

The first lever guide surface 127E may be connected to the second lever 131E, and guide the second lever 131E to move linearly in the up-down direction simultaneously with a movement of the first lever 120E.

Meanwhile, the first lever 120E may be supported by a guide portion 140E to move. The guide portion 140E may include a guide protrusion 141E formed on the damping bracket 110E, and a guide slot 142E formed in the first lever 120E to correspond to the guide protrusion 141E. The guide slot 142E may be a long hole along which the first lever 120E moves. The guide portion 140E may further include at least one guide support protrusion 143E for supporting the lower end of the first lever 120E. The at least one guide support protrusion 143E may be formed to support a front-back movement of the first lever 120E.

Meanwhile, when the door 11 is not pressed, the first lever 120E may be located at the first position P1, and when the door 11 is pressed, the pressing portion 38 of the door 11 may press the contact portion 121E of the first lever 120E, and then, the first lever 120E may move backward to be located at the second position P2.

When the first lever 120E moves to the second position P2, the second lever 131E of the damper 130E connected to the rear portion of the first lever 120E and located above the first lever 120E may generate resistance in a direction that is vertical to the movement direction of the first lever 120E.

Details about the structure and operations of the damping assembly 100E with the above-described configuration will be able to be understood sufficiently from the above description, and therefore, overlapping descriptions thereof will be omitted.

Figure 20:
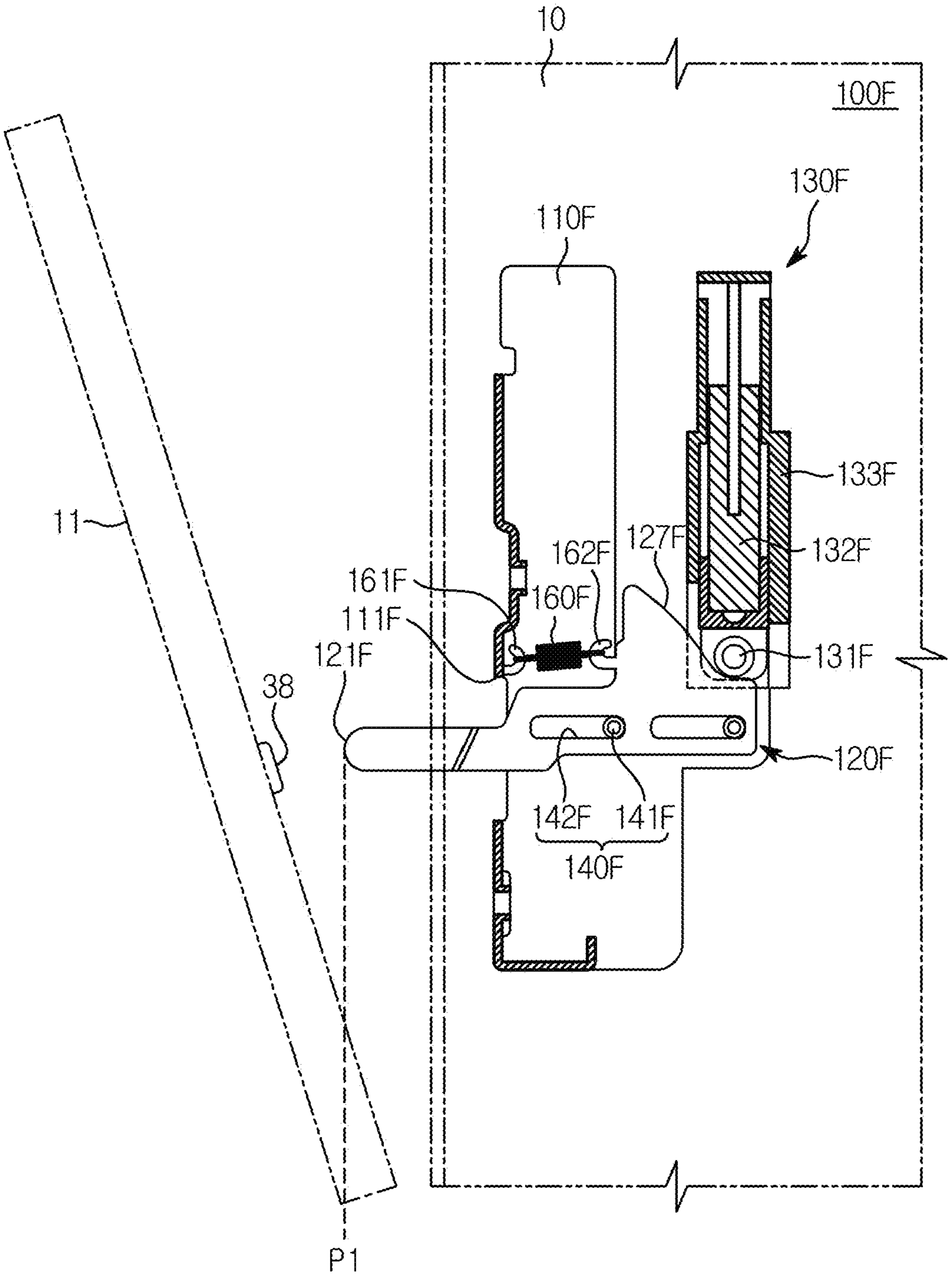
FIGS. 20 and 21 show a damping assembly and an operation of the damping assembly, according to a seventh embodiment of the disclosure.
Figure 21:
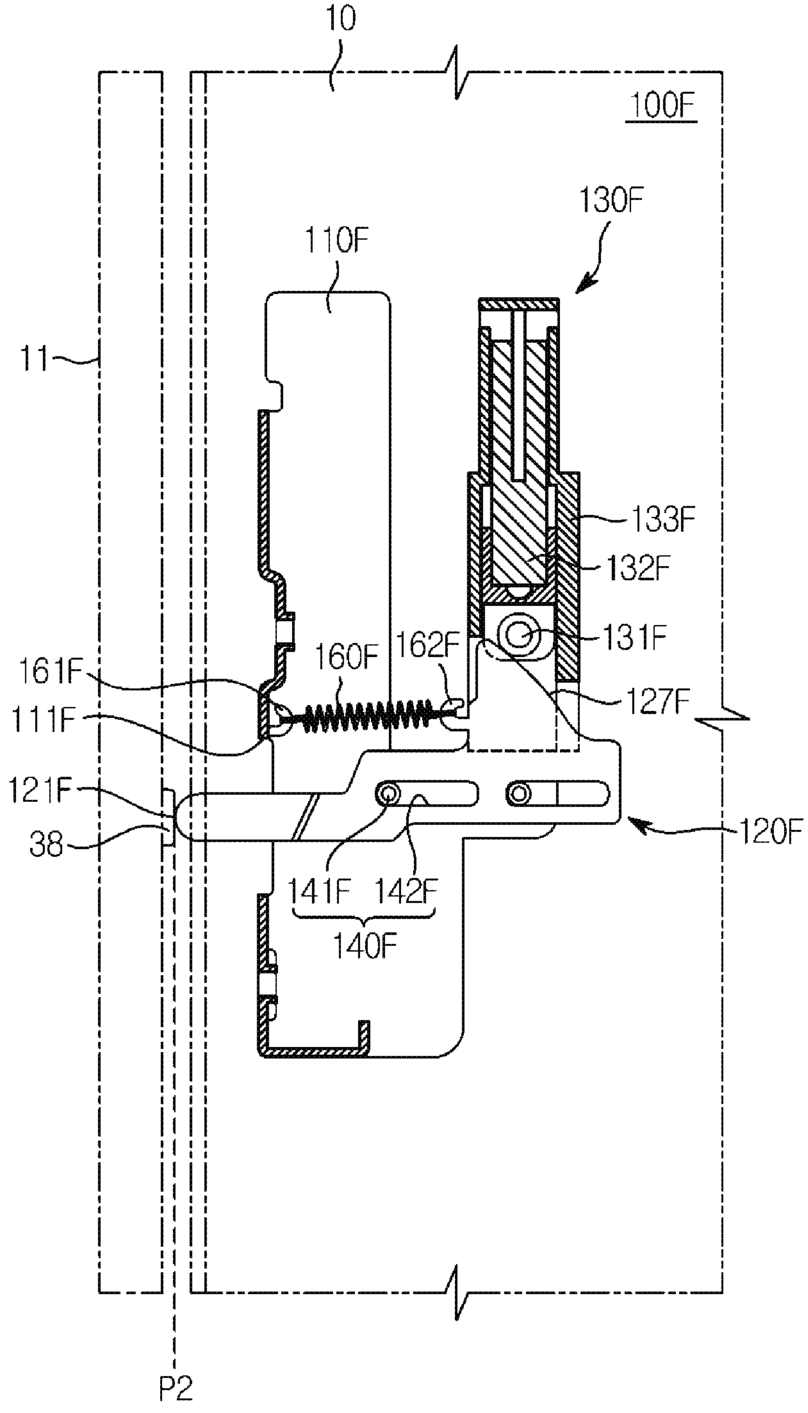

FIGS. 20 and 21 show a damping assembly and an operation of the damping assembly, according to a seventh embodiment of the disclosure. Reference numerals not shown in FIGS. 20 and 21 will be able to be understood by referring to FIGS. 1 to 8.

Referring to FIGS. 20 and 21, a damping assembly 100F may be installed in the main body 10.

The damping assembly 100F may include a damping bracket 110F, a first lever 120F disposed in the damping bracket 110F, and a damper 130F connected to the rear portion of the first lever 120F and disposed above the first lever 120F.

In the front lower portion of the damping bracket 110F, a first lever installing space 111F in which the first lever 120 is installed to be movable in the front-back direction may open.

The damper 130F connected to the first lever 120F may be disposed behind and above the first lever 120F to move linearly in a direction that is vertical to a movement path of the first lever 120F.

The damper 130F may include a second lever 131F connected to the first lever 120F to be movable vertically, a cylinder 132F connected to the second lever 131F, and a cylinder housing 133F accommodating the cylinder 132F.

The first lever 120F may be movable in the front-back direction. The first lever 120F may include a contact portion 121F at the front end to be pressed by the pressing portion 38 of the door 11.

At the rear end of the first lever 120F, a first lever guide surface 127F may be formed with an inclination to guide the second lever 131F to move vertically simultaneously with a movement of the first lever 120F.

The first lever guide surface 127F may contact the second lever 131F to guide the second lever 131F to move linearly in the up-down direction simultaneously with a movement of the first lever 120F.

The first lever 120F may be supported by a guide portion 140F to move. The guide portion 140F may include a guide protrusion 141F formed on the damping bracket 110F, and a guide slot 142F formed in the first lever 120F to correspond to the guide protrusion 141F. The guide slot 142F may be a long hole along which the first lever 120F moves.

Meanwhile, the damping assembly 100F may include an elastic member 160F connecting the first lever 120F to the damping bracket 110F. The damping bracket 110F may include a first elastic member connecting portion 161F protruding backward. The first lever 120F may include a second elastic member connecting portion 162F protruding forward.

When the door 11 is not pressed, the elastic member 160F may be compressed to move the first lever 120F to the first position P1.

When the door 11 is pressed, the pressing portion 38 of the door 11 may press the contact portion 121F of the first lever 120F, and then the first lever 120F may move backward to be located at the second position P2.

When the first lever 120F moves to the second position P2, the second lever 131F of the damper 130F connected to the rear portion of the first lever 120F and located above the first lever 120F may generate resistance in a direction that is vertical to the movement direction of the first lever 120F.

Details about the structure and operations of the damping assembly 100F with the above-described configuration will be able to be understood sufficiently from the above description, and therefore, overlapping descriptions thereof will be omitted.

Figure 22:
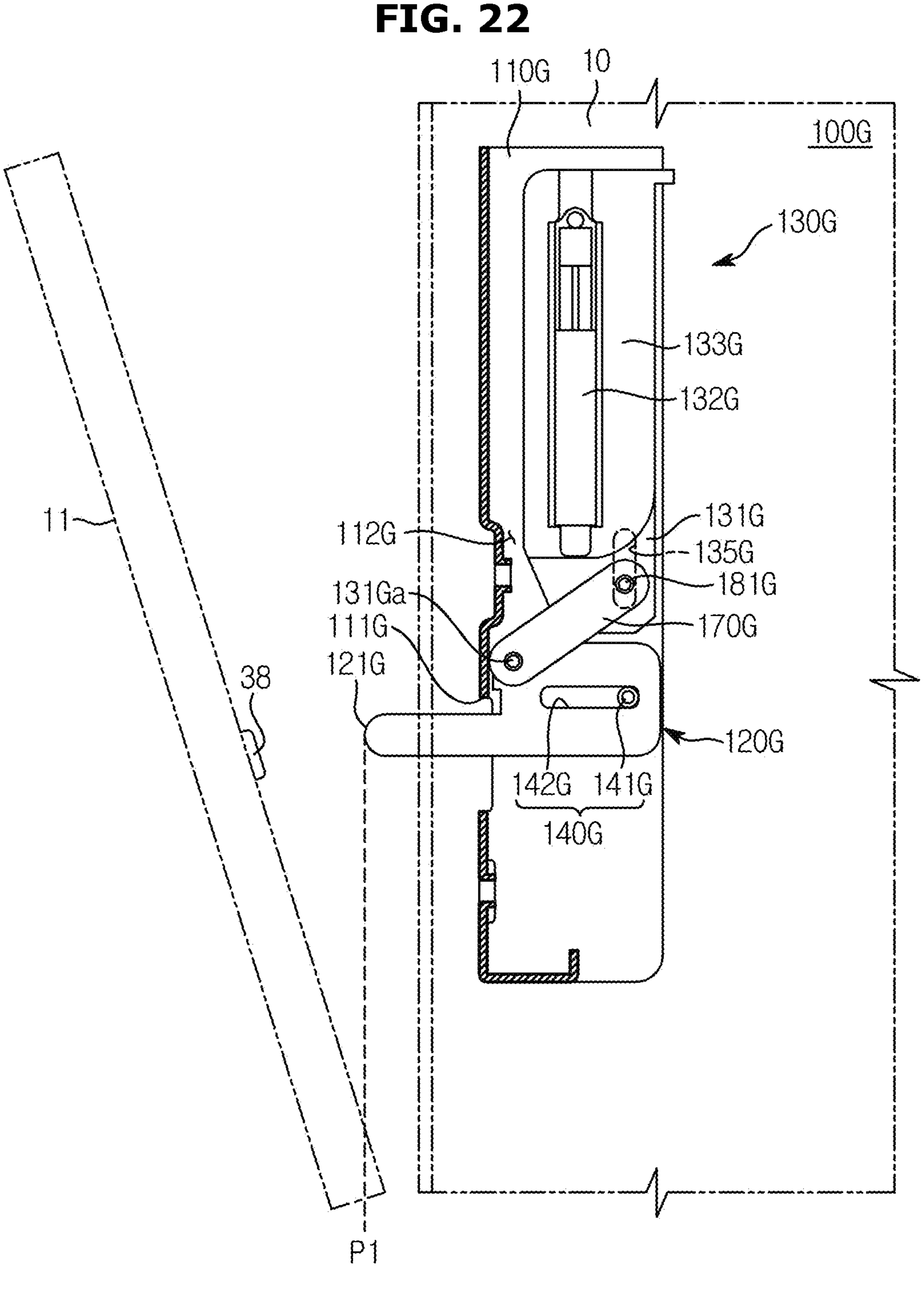
FIGS. 22 and 23 show a damping assembly and an operation of the damping assembly, according to an eighth embodiment of the disclosure.
Figure 23:
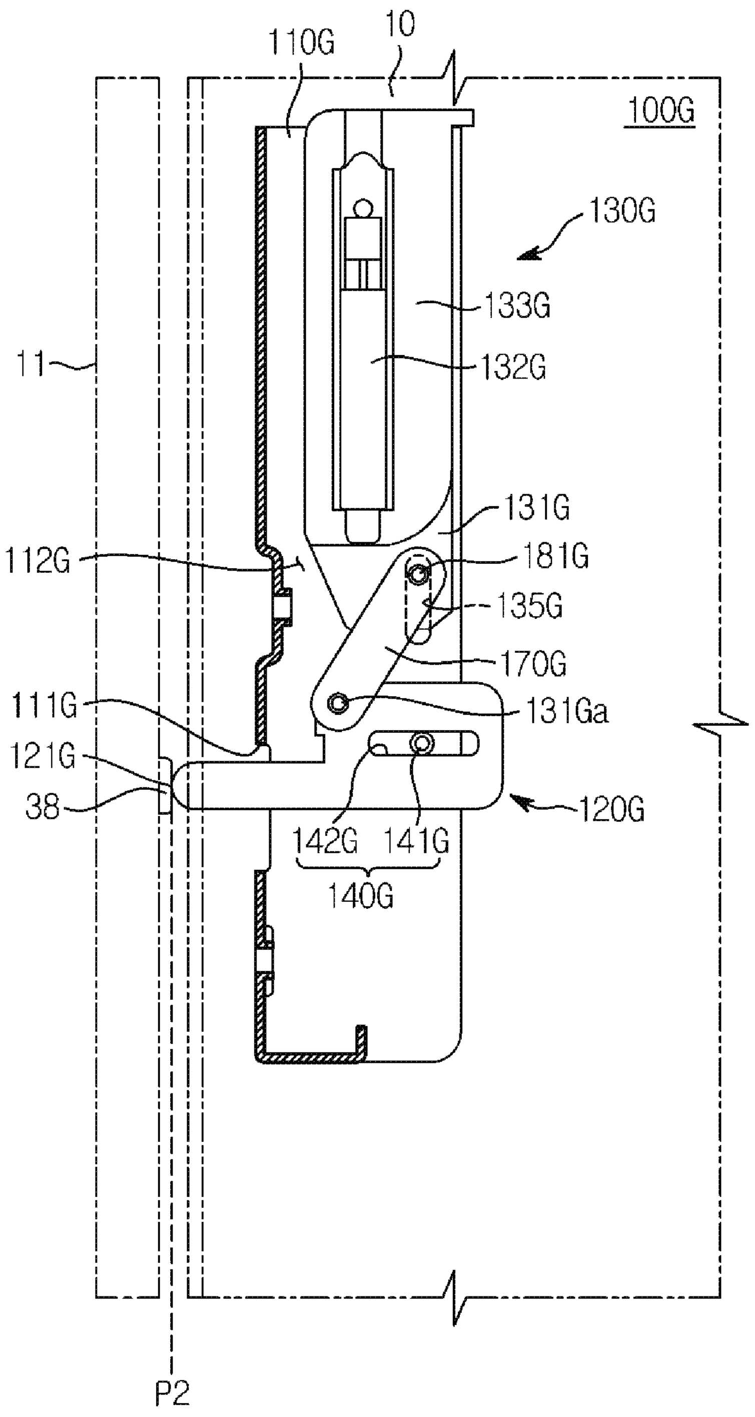

FIGS. 22 and 23 show a damping assembly and an operation of the damping assembly, according to an eighth embodiment of the disclosure. Reference numerals not shown in FIGS. 22 and 23 will be able to be understood by referring to FIGS. 1 to 8.

Referring to FIGS. 22 and 23, a damping assembly 100G may be installed in the main body 10.

The damping assembly 100G may include a damping bracket 110G, a first lever 120G disposed in the damping bracket 110G, and a damper 130G connected to the first lever 120G.

The damping bracket 110G may include an accommodating space 112G in which the first lever 120G and the damper 130G are installed.

In the front lower portion of the damping bracket 110G, a first lever installing space 111G may be formed in which the first lever 120G is installed to be movable in the front-back direction.

The damper 130G connected to the first lever 120G may be disposed above the first lever 120G in such a way to be movable in a direction that is vertical to a movement path of the first lever 120G.

The damper 130G may include a second lever 131G connected to the first lever 120G by a connection link 170G to be movable vertically, a cylinder 132G connected to the second lever 131G and moving in the up-down direction, and a cylinder housing 133G for accommodating the cylinder 132G and installing the cylinder 132G in the damping bracket 110G.

The first lever 120G may be accommodated in the accommodating space 112G of the damping bracket 110G to be movable horizontally. The first lever 120G may include a contact portion 121G at the front end to be pressed by the pressing portion 38 of the door 11.

At the top end of the first lever 120G, a first lever connecting portion 131Ga may be disposed to be rotatably connected to the connection link 170G.

One end of the connection link 170G may be rotatably connected to the first lever connecting portion 131Ga of the first lever 120G, and at the other end of the connection link 170G, a connection link guide protrusion 181G may be provided to correspond to a second lever guide slot 135G of the second lever 131G which will be described later.

In this case, the one end of the connection link 170G may be located at the top end of the first lever 120G, and the other end of the connection link 170G may be located at the lower end of the second lever 131G, so that the connection link 170G may move backward when the first lever connecting portion 131Ga rotates and the connection link guide protrusion 181G may move upward along the second lever guide slot 135G.

The connection link guide protrusion 181G may be connected to the second lever 131G, and guide the second lever 131G to move simultaneously with a movement of the first lever 120G.

In the second lever 131G, the second lever guide slot 135G may be formed to correspond to the connection link guide protrusion 181G of the connection link 170G. The second lever guide slot 135G may move the second lever 131G in the up-down direction by the connection link guide protrusion 181G.

Meanwhile, the first lever 120G may move by a guide portion 140G with respect to the damping bracket 110G. The guide portion 140G may include a guide protrusion 141G formed on the damping bracket 110G, and a guide slit 142 formed in the first lever 120G and guided by the guide protrusion 141G of the damping bracket 110G. The guide slit 142G may be a long hole. The guide slit 142G may be formed in parallel to a movement direction of the first lever 120.

The second lever 131G may be coupled in such a way to be movable by the cylinder 132G. The cylinder 132G may be accommodated in the cylinder housing 133G.

When the door 11 is not pressed, the first lever 120G may be located at the first position P1.

In contrast, when the door 11 is pressed, the pressing portion 38 of the door 11 may press a contact portion 121G of the first lever 120G, and then the first lever 120G may move backward to be located at the second position P2.

When the first lever 120G moves to the second position P2, the damper 130G connected to the rear portion of the first lever 120G and located above the first lever 120G may generate resistance in a direction that is vertical to the movement direction of the first lever 120G.

Details about the structure and operations of the damping assembly 100G with the above-described configuration will be able to be understood sufficiently from the above description, and therefore, overlapping descriptions thereof will be omitted.

Figure 24:
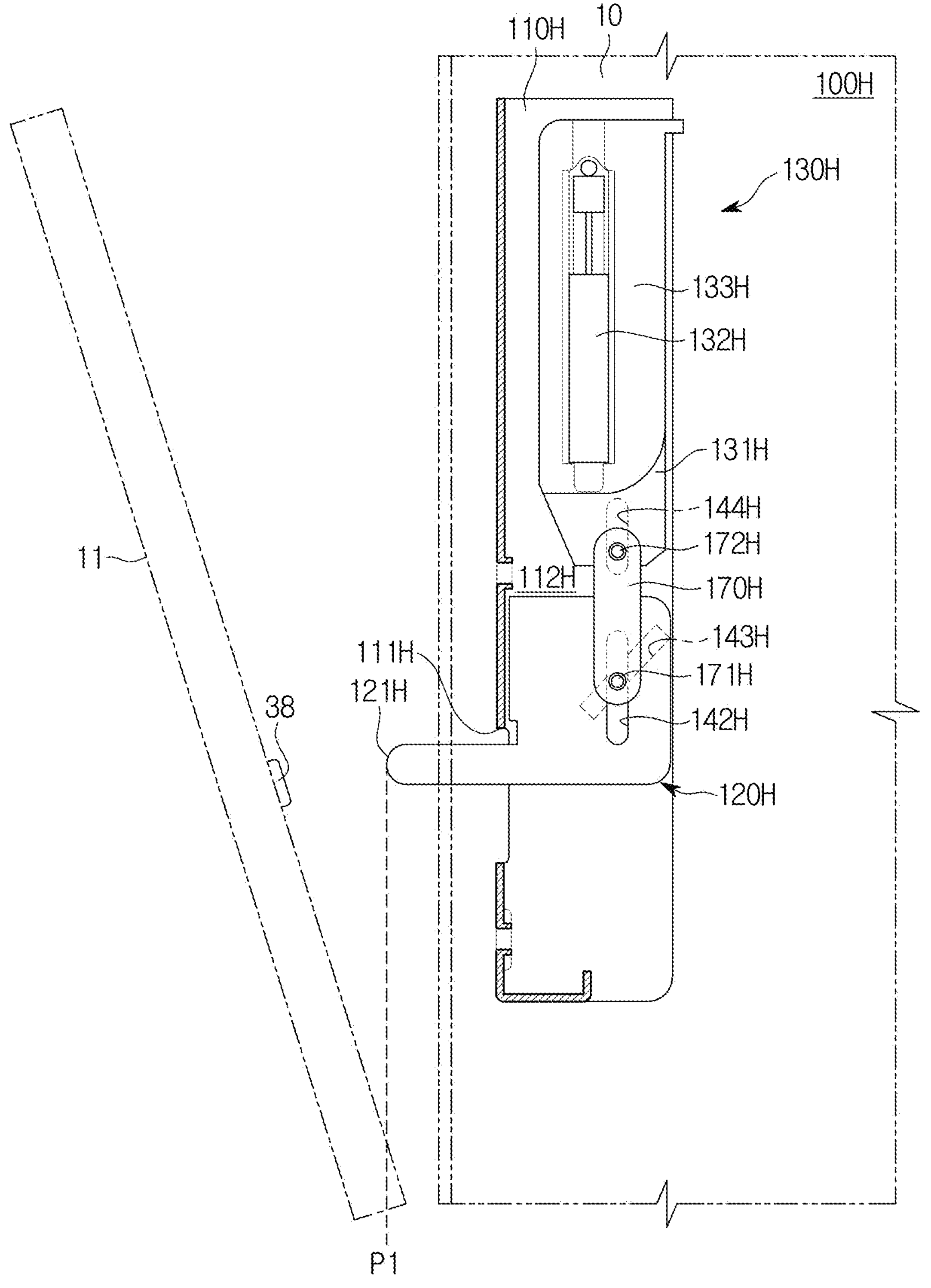
FIGS. 24 and 25 show a damping assembly and an operation of the damping assembly, according to a ninth embodiment of the disclosure.
Figure 25:
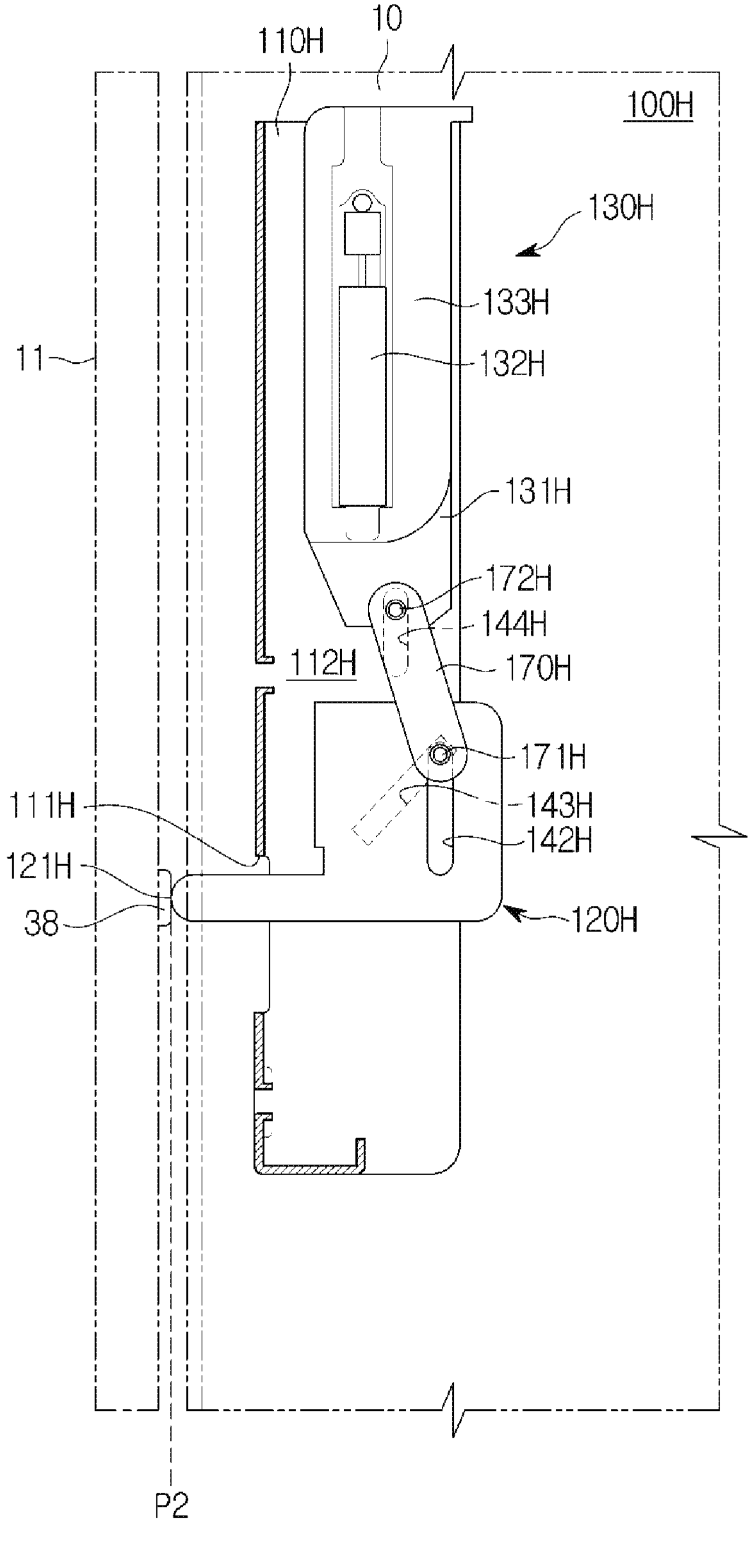

FIGS. 24 and 25 show a damping assembly and an operation of the damping assembly, according to a ninth embodiment of the disclosure. Reference numerals not shown in FIGS. 24 and 25 will be able to be understood by referring to FIGS. 1 to 8.

Referring to FIGS. 24 and 25, a damping assembly 100H may be installed in the main body 10. The damping assembly 100H may include a damping bracket 110H, a first lever 120H disposed in the damping bracket 110H, and a damper 130H connected to the first lever 120H.

The damping bracket 110H may include an accommodating space 112H in which the first lever 120H and the damper 130H are installed.

In the front lower portion of the damping bracket 110H, a first lever installing space 111H may be formed in which the first lever 120H is installed to be movable in the front-back direction.

The damper 130H connected to the first lever 120H may be disposed above the first lever 120H to move linearly in a direction that is vertical to a movement path of the first lever 120H.

The damper 130H may include a second lever 131H connected to the first lever 120H by a connection link 170H to be movable vertically, a cylinder 132H connected to the second lever 131H and moving in the up-down direction, and a cylinder housing 133H for accommodating the cylinder 132H and installing the cylinder 132H in the damping bracket 110H.

The first lever 120H may be accommodated in the accommodating space 112H of the damping bracket 110H to be movable horizontally. The first lever 120H may include a contact portion 121H at the front end to be pressed by the pressing portion 38 of the door 11.

In the first lever 120H, a first lever guide slot 142H may be formed to connect to the connection link 170H. The first lever guide slot 142H may be formed in the up-down direction.

One end of the connection link 170H may be connected to the first lever 120H, and the other end of the connection link 170H may be connected to the second lever 131H. The connection link 170H may include a first connection link protrusion 171H and a second connection link protrusion 172H. The first connection link protrusion 171H and the second connection link protrusion 172H may be respectively disposed at both ends of the connection link 170H.

The first connection link protrusion 171H may be connected to the first lever guide slot 142H of the first lever 120H, and the second connection link protrusion 172H may be connected to the second lever 131H.

The first connection link protrusion 171H may be connected to a first damping bracket guide slot 143H formed in the damping bracket 110H to support the first lever 120H moving in the left-right direction with respect to the damping bracket 110H.

Also, the second connection link protrusion 172H may be connected to a second damping bracket guide slot 144H formed in the damping bracket 110H to support the second lever 131H moving in the up-down direction with respect to the damping bracket 110H.

The first connection link protrusion 171H may be connected to both the damping bracket 110H and the first lever 120H to guide movements of the first lever 120H and the connection link 170H.

The first damping bracket guide slot 143H may be formed in the shape of an oblique line tilting up such that the rear portion is higher than the front portion. The second damping bracket guide slot 144H may be formed in the shape of a straight line extending in the up-down direction.

When the first lever 120H moves backward along the first damping bracket guide slot 143H through the first lever guide slot 142H, the first connection link protrusion 171H of the connection link 170H may move upward by the first lever guide slot 142H of the first lever 120H.

The second connection link protrusion 172H may be connected to the second lever 131H to guide the second lever 131H to move along the second damping bracket guide slot 144H.

The second connection link protrusion 172H of the connection link 170H may guide the second lever 131H to move in the up-down direction.

The second lever 131H may be coupled the cylinder 132H. The cylinder 132H may be accommodated in the cylinder housing 133H.

When the door 11 is not pressed, the first lever 120H may be located at the first position P1.

In contrast, when the door 11 is pressed, the pressing portion 38 of the door 11 may press the contact portion 121H of the first lever 120H, and then, the first lever 120H may move backward to be located at the second position P2.

When the first lever 120H moves to the second position P2, the damper 130H connected to the first lever 120H and located above the first lever 120H may generate resistance in a direction that is vertical to the movement direction of the first lever 120H.

Details about the structure and operations of the damping assembly 100H with the above-described configuration will be able to be understood sufficiently from the above description, and therefore, overlapping descriptions thereof will be omitted.

Figure 26:
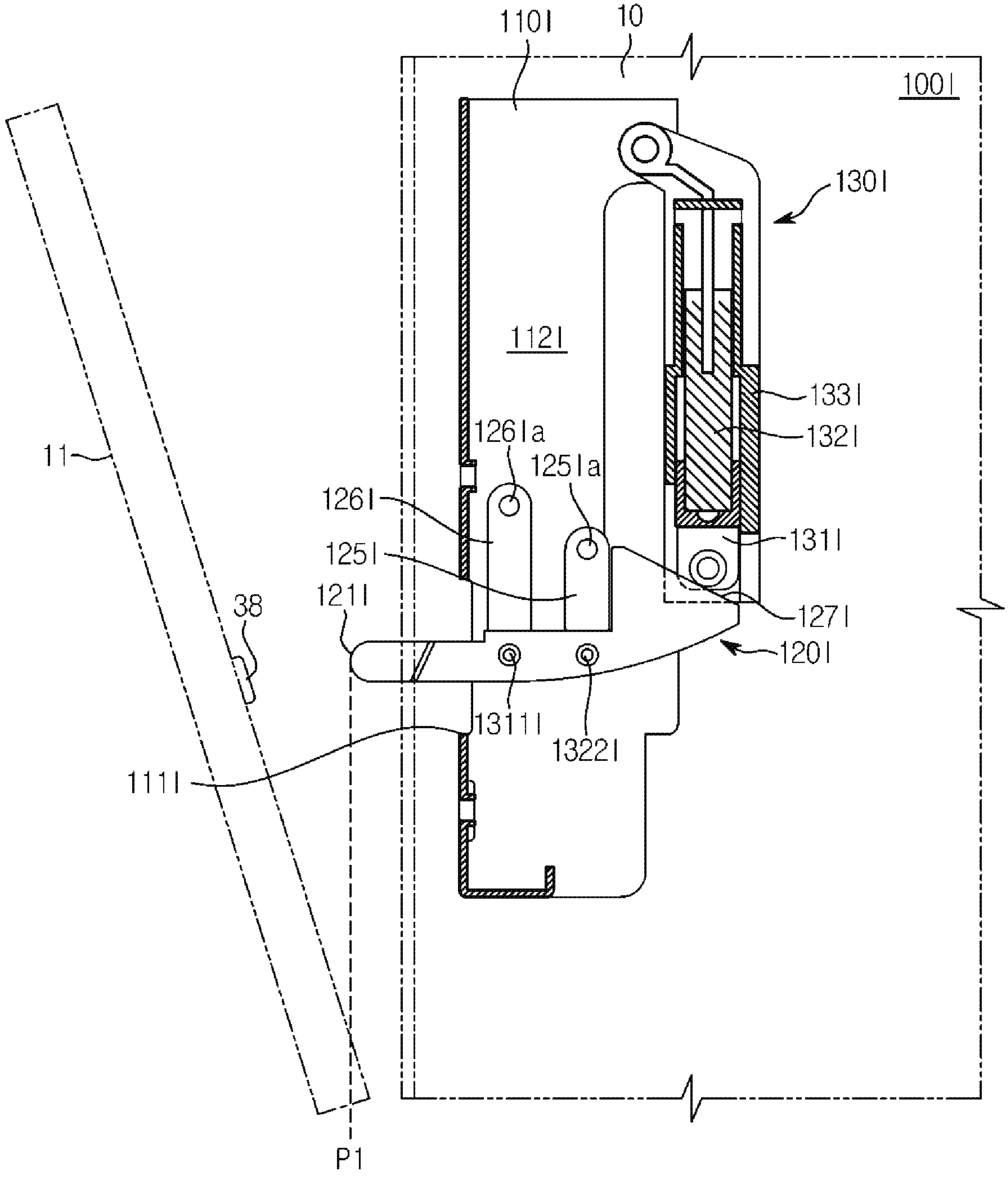
FIGS. 26 and 27 show a damping assembly and an operation of the damping assembly, according to a tenth embodiment of the disclosure.
Figure 27:
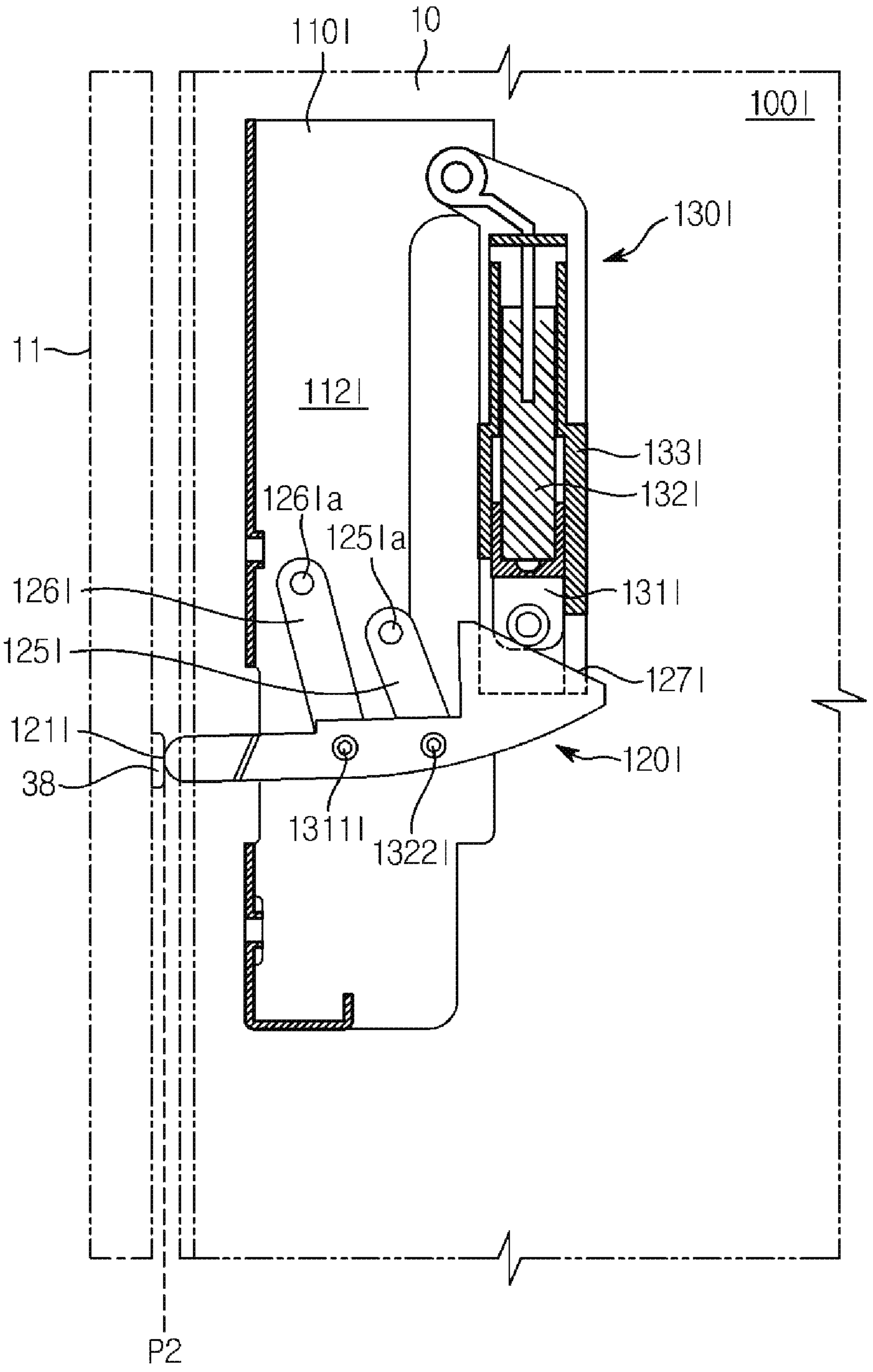

FIGS. 26 and 27 show a damping assembly and an operation of the damping assembly, according to a tenth embodiment of the disclosure. Reference numerals not shown in FIGS. 26 and 27 will be able to be understood by referring to FIGS. 1 to 8.

Referring to FIGS. 26 and 27, a damping assembly 100I may be installed in the main body 10.

The damping assembly 100I may include a damping bracket 110I, a first lever 120I disposed in the damping bracket 110I, and a damper 130I connected to the rear end of the first lever 120I and located above the first lever 120I.

The damping bracket 110I may include an accommodating space 112I in which the first lever 120I and the damper 130I are installed.

In the front lower portion of the damping bracket 110I, a first lever installing space 111I in which the first lever 120I is installed to be movable in the front-back direction may open.

The damper 130I connected to the first lever 120I may be disposed behind and above the first lever 120I to move linearly in a direction that is vertical to a movement path of the first lever 120I.

The damper 130I may include a second lever 131I connected to the first lever 120I to be movable vertically, a cylinder 132I connected to the second lever 131I, and a cylinder housing 133I for accommodating the cylinder 132I and installing the cylinder 132I in the damping bracket 110I.

The first lever 120I may be accommodated in the accommodating space 112I of the damping bracket 110I in such a way to be movable in the front-back direction. The first lever 120I may include a contact portion 121I at the front end to be pressed by the pressing portion 38 of the door 11.

The first lever 120I may be connected to a first link 126I and a second link 125I installed on the damping bracket 110I. At the upper ends of the first link 126I and the second link 125I, a first link rotating shaft 126Ia and a second link rotating shaft 125Ia may be disposed. One end of the first link 126I may be fixed at the first link rotating shaft 126Ia, and the other end of the first link 126I may be rotatably installed. One end of the second link 125I may be fixed at the second link rotating shaft 125Ia, and the other end of the second link 125I may be rotatably installed.

The first link 126I may be longer than the second link 125I.

The first lever 120I may include a first first-lever rotation shaft 1311I and a second first-lever rotation shaft 1322I. The first first-lever rotation shaft 1311I of the first lever 120I may be connected to the first link 126I. The second first-lever rotation shaft 1322I of the first lever 120I may be connected to the second link 125I.

Accordingly, when the contact portion 121I is pressed by the door 11, the first lever 120I may move backward, while the first first-lever rotation shaft 1311I and the second first-lever rotation shaft 1322I are rotatably supported by the first link 126I and the second link 125I.

Meanwhile, in the rear portion of the first lever 120I, a first-lever guide surface 127I may be formed to guide the second lever 131I to move vertically simultaneously with a movement of the first lever 120I.

The first-lever guide surface 127I may be connected to the second lever 131I, and guide the second lever 131I to linearly move vertically simultaneously with a movement of the first lever 120I.

The second lever 131I may be accommodated in the cylinder housing 133I to move vertically by the cylinder 132I.

Meanwhile, when the door 11 is not pressed, the first lever 120I may be located at the first position P1, and when the door 11 is pressed, the pressing portion 38 of the door 11 may press the contact portion 121I of the first lever 120I, and then the first lever 120I may move to the second position P2.

When the first lever 120I moves to the second position P2, the second lever 131I of the damper 130I connected to the rear portion of the first lever 120I and located above the first lever 120I may generate resistance in a direction that is vertical to the movement direction of the first lever 120I.

Details about the structure and operations of the damping assembly 100I with the above-described configuration will be able to be understood sufficiently from the above description, and therefore, overlapping descriptions thereof will be omitted.

According to the embodiments of the disclosure, it may be possible to reduce abrasion, impacts, and noise that are caused by repetitive use of the door.

Also, through direct driving of the door apparatus, it may be possible to reduce manufacturing cost with a small number of parts.

Also, by buffering the door when it is closed, it may be possible to reduce impacts and noise, thereby improving a user's convenience and durability.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A home appliance comprising:

a main body having an opening;

a door configured to open or close the opening;

a lever installed in the main body, the lever being configured to be movable between a first position and a second position;

a damper installed in the main body, the damper being configured to, when a second end of the lever is pressed by the door to move from the first position to the second position, generate a resistance in a direction that is opposite to a movement direction of the lever; and at least one elastic member configured to, when pressure applied on the lever is removed, elastically bias the lever such that the lever moves from the second position to the first position, wherein the lever includes a first end, a middle portion, and the second end opposite to the first end, wherein the first end of the lever is connected to the damper via the at least one elastic member, wherein the middle portion of the lever is connected to the damper via a second lever, wherein the second end of the lever is configured to be pressed by the door, wherein the middle portion of the lever includes at least one slit formed in parallel to the movement direction of the lever, wherein the at least one slit of the lever includes two slits, and wherein the two slits are disposed side-by-side on a same plane in the movement direction of the lever.

2. The home appliance of claim 1, wherein the damper generates the resistance in a direction that is parallel to or vertical to a movement path of the lever, and wherein the damper is further configured to buffer the door when the door is shut closed.

3. The home appliance of claim 1, further comprising:

a guide portion configured to move the lever with respect to the main body, wherein the guide portion comprises: at least one guide protrusion formed in the main body, and wherein the at least one slit of the lever is formed to correspond to the at least one guide protrusion.

4. The home appliance of claim 1, wherein the damper comprises:

a cylinder connected to the second lever; and a cylinder housing accommodating the cylinder and installed in the main body.

5. The home appliance of claim 4, wherein a first end of the at least one elastic member is connected to the cylinder housing, and a second end of the at least one elastic member is connected to the lever.

6. The home appliance of claim 1, wherein a movement direction of the second lever is parallel to or vertical to the movement direction of the lever.

7. The home appliance of claim 1, wherein the two slits have a substantially same length extending in the movement direction of the lever.

* * * * *